US007731587B2

(12) United States Patent
Kumagai

(10) Patent No.: US 7,731,587 B2
(45) Date of Patent: Jun. 8, 2010

(54) PRIZE GAME APPARATUS

(75) Inventor: Naoji Kumagai, Tokyo (JP)

(73) Assignee: Kabushiki Kaisha Sega, Tokyo (JP)

(*) Notice: Subject to any disclaimer, the term of this patent is extended or adjusted under 35 U.S.C. 154(b) by 592 days.

(21) Appl. No.: 11/485,584

(22) Filed: Jul. 12, 2006

(65) Prior Publication Data

US 2007/0013139 A1 Jan. 18, 2007

(30) Foreign Application Priority Data

Jul. 13, 2005 (JP) ............................ 2005-204929

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................................ 463/25; 463/7

(58) Field of Classification Search .................... 463/25
See application file for complete search history.

(56) References Cited

U.S. PATENT DOCUMENTS 6,234,487 B1 * 5/2001 Shoemaker, Jr. ............ 273/447
2002/0067002 A1 * 6/2002 Yoshida et al. .............. 273/447
2003/0151202 A1 * 8/2003 Fisher et al. ................ 273/447

FOREIGN PATENT DOCUMENTS

JP 07-102253 A 4/1995
JP 2002-239209 A 8/2002
JP 2002239209 A * 8/2002
JP 2005-034249 A 2/2005

OTHER PUBLICATIONS

Amusement Journal, pp. 91 (Part C), 144-145 (Part A-B), and 240 (Part D), vol. 4, No. 9, Issue 041, Sep. 2004.

* cited by examiner

*Primary Examiner*—John M Hotaling
*Assistant Examiner*—Kevin Y. Kim
(74) *Attorney, Agent, or Firm*—Drinker Biddle & Reath LLP

(57) ABSTRACT

A prize game apparatus that has plural pairs of pickup arms and can adjust the distance between the pairs of pickup arms is provided.

A prize game apparatus includes: a pickup unit capable of moving in specified directions; plural pairs of pickup arms attached to the pickup unit; an opening/closing unit for opening and closing the pairs of pickup arms; and a distance adjustment unit for adjusting the distance between the pairs of pickup arms by moving the pair(s) of pickup arms; wherein a prize is picked up or released by closing or opening the pairs of pickup arms.

18 Claims, 18 Drawing Sheets

PRIZE GAME APPARATUS

CROSS-REFERENCES TO RELATED APPLICATIONS

This application relates to and claims priority from Japanese Patent Application No. 2005-204929, filed on Jul. 13, 2005, the entire disclosure of which is incorporated herein by reference.

BACKGROUND

The present invention relates to a prize game apparatus for picking up or releasing a prize, using plural pairs of pickup arms.

Many prize game apparatuses such as crane game machines designed for a player to win a prize contained in a housing are placed not only in amusement parks, but also at general shops and shopping malls because it is fun to operate those kinds of game apparatuses, and fascinating targets such as popular characters are used as prizes, giving a player incentive to play the game.

Various kinds of goods of different shapes, sizes, and materials are used as prizes in a prize game apparatus. Since a catcher (or a prize pickup device) directly comes in contact with a prize in the prize game apparatus, the shape and other characteristics of the prize greatly affect the chances of obtaining the prize. However, conventional prize game apparatuses are configured to allow only one pattern for the opening/closing action of the pickup arms provided on the catcher, and the probability of winning a prize with the catcher is determined largely depending on the shape of the pickup arms. Accordingly, this type of prize game apparatus has turned out to be monotonous as a game machine.

Therefore, JP-B-7-102253, for example, introduces a prize game apparatus having a catcher equipped with: plural pairs of pickup arms (or claws); a pickup arm drive unit for closing the pairs of pickup arms, each pair independently; a selector for randomly selecting the pair of pickup arms to be closed by the prize pickup drive unit; and a control unit for controlling the pickup arm drive unit to close only the selected pair of pickup arms. When the catcher in this prize game apparatus is lowered, the pair of pickup arms selected by the selector is closed to pick up a prize on a platform. Therefore, the number of prizes picked up can change according to the selection by the selector, thereby further stimulating the player's interest and eagerness for the game.

JP-A-2002-239209, for example, also introduces a prize game apparatus including: a grasping-power changing unit capable of automatically changing the power of pickup arms of a catcher that grasps a prize; and a drive control unit for driving the grasping-power changing unit to change the grasping power of the pickup arms. Since this prize game apparatus automatically changes the grasping power of the pickup arms by driving the grasping-power changing unit, variations can be created in a game by, for example, causing the grasping power of the pickup arms that have easily picked up a prize to be weakened during a game, thereby making the pickup arms drop the prize. Consequently, the player's interest in and eagerness for playing the game with the prize game apparatus will be further stimulated.

Moreover, JP-A-2005-34249, for example, introduces a prize game apparatus including: shaking members that are configured to be capable of shaking the pickup arms of a catcher, that apply a shaking force to the pickup arms, and make the pickup arms shake synchronously toward their respective 'open' position of the pickup arms; a moving unit for moving the shaking members; respective springs with one end locked by a pickup arm and their other end locked by a shaking member to apply a force to the pickup arms in their 'closing' direction; and a control member for controlling the moving unit so that the part of each spring locked with the relevant shaking member is kept separated from the part of each spring locked with the relevant pickup arm after moving away from the pickup arm, and the movement distance of the shaking member is able to be adjusted. This prize game apparatus can easily adjust the force to be applied to the pickup arms, thereby stimulating the player's interest and eagerness for the game.

However, in the prize game apparatus described in JP-B-7-102253, the distance between a pair of pickup arms and another adjacent pair of pickup arms is decided in advance. Therefore, the distance cannot be adjusted arbitrarily as desired.

In the prize game apparatuses described in JP-A-2002-239209 and JP-A-2005-34249, a catcher having a pair of pickup arms is provided. A catcher with plural pairs of pickup arms is not considered in these cases.

SUMMARY

This invention was devised in light of the circumstances described above. It is an object of the invention to provide a prize game apparatus capable of adjusting the distance between plural pairs of pickup arms.

In order to achieve the above-described object of the invention, provided is a prize game apparatus including: a pickup unit capable of moving in specified directions; plural pairs of pickup arms attached to the pickup unit; an opening/closing unit for opening and closing the pairs of pickup arms; and a distance adjustment unit for adjusting the distance between the pairs of pickup arms by moving the pair(s) of pickup arms; wherein a prize is picked up or released by closing or opening the pairs of the pickup arms.

The prize game apparatus configured in the above-described manner can change the difficulty level for obtaining a prize by adjusting the distance between a pair of pickup arms and its adjacent pair of pickup arms. Specifically speaking, obtaining a prize can be made easier or harder by adjusting the distance between the pairs of pickup arms depending on game conditions such as the characteristics of a prize (for example, the shape, size, and material of the prize) or a player's skill in picking up a prize. Accordingly, it is possible to prevent the prize game from becoming monotonous and maintain the player's interest in the game.

Concerning the pairs of pickup arms mentioned above, at least two pairs are necessary. If three or more pairs of pickup arms are provided, the distances between the respective pairs of pickup arms may be adjusted either synchronously or individually.

The distance adjustment unit of the prize game apparatus includes a distance adjustment motor, feed screws rotated by the distance adjustment motor, and feed nuts screwed on the feed screws and connected to the pickup arms, and the pair of pickup arms can be moved and the distance adjusted by rotating the feed screws.

Moreover, the prize game apparatus can further include a distance adjustment motor controller for drive control of the distance adjustment motor based on external information input.

The information input from outside may be position information about the pickup arm as sensed by a position sensor provided on the prize game apparatus for sensing the position of the pickup arms.

The information input from outside may also be information about counting results of a timer provided on the prize game apparatus for measuring adjustment time [the time taken to adjust the distance]. A time limit can be set for the distance adjustment time by controlling driving of the distance adjustment motor and adjusting the distance between pickup arms constituting a pair based on the aforementioned information. It is also possible to prevent the game from becoming monotonous, and to maintain the player's interest in the game.

The opening/closing unit of the prize game apparatus includes an opening/closing motor, a worm rotated by the opening/closing motor, and a pair of worm wheels engaging with the worm. The opening/closing unit can be configured so that the worm wheels are respectively connected to the base end of one pair of pickup arms, from among the plural pairs of pickup arms, and the worm wheels are rotated by rotation of the worm, thereby opening or closing the pair of pickup arms.

Moreover, the prize game apparatus can further includes a transmission shaft for transmitting the rotation of the worm wheels to the remaining pair of pickup arms by connecting the worm wheels to the remaining pair of pickup arms. In addition to the aforementioned advantageous effects of the invention, the above-described configuration allows one worm and a pair of worm wheels to open and close the plural pairs of pickup arms. Accordingly, size and weight reduction can be achieved and an increase in the number of components can be prevented.

The prize game apparatus can further include: an opening-action locking member for locking the opening action of the pickup arms by coming into contact with the pickup arms and preventing the rotation of the worm wheels when the worm wheels have rotated a specified amount in a first direction; and a closing-action locking member for locking the closing action of the pickup arms by coming into contact with the pickup arms and preventing the rotations of the worm wheels when the worm wheels have rotated a specified amount in the direction opposite the first direction. In addition to the aforementioned advantageous effects of the invention, the above-described configuration enables the opening and closing actions of the pickup arms more properly.

The prize game apparatus can further include a force-applying member for applying force to close the pickup arms when the pickup arms are locked by the closing-action locking member. In addition to the aforementioned advantageous effects of the invention, the above-described configuration can further provide the power to hold (or grasp) a prize, using the force applied by the force-applying member when the top ends of the pickup arms hold the prize.

The worm is mounted at a position enabling contact with the force-applying member and the mounting position can be changed, and the expansion or contraction length of the force-applying member can be changed according to the mounting position. This does not change the stroke of the worm itself, but can change (or adjust) the expansion or contraction length of the force-applying member. Consequently, the grasping power of the pickup arms can be adjusted according to changes in the expansion or contraction length of the force-applying member.

Furthermore, the prize game apparatus can include: a prize pickup device for picking up a prize; an operating unit for a player to operate the prize pickup device; a delivery opening allowing the prize to be discharged; and a housing for accommodating the prize, the prize pickup device, and the delivery opening; wherein the pickup unit, the pickup arms, and the opening/closing unit are provided on the prize pickup device. This configuration enables easy external operation of the prize pickup device.

The distance adjustment unit can adjust the distance based on information input from the operating unit.

Moreover, the distance adjustment unit can adjust the distance based on the payout rate at which the prizes are paid out. The "payout rate" means the number of obtained prizes with respect to the number of times (or the number of plays) a player plays the game to pick up a prize with the prize game apparatus. Specifically speaking, when a coin (for example, a 100-yen coin) is inserted into a coin slot, a coin sensor detects the insertion of the coin; and when a prize falls into the discharge opening, a sensor (such as an infrared sensor) for detecting a prize falling down detects it. Based on the above information, a main body CPU calculates the number of times prizes are paid out with respect to the number of times the coins are inserted. If a player won, for example, three prizes out of ten times playing the game (out of ten times they inserted a 100-yen coin), the payout rate would be 30%.

This payout rate mainly reflects the player's skill in picking up a prize. It is possible to control driving of the distance adjustment motor and adjust the distance between a pair of pickup arms based on the information about the payout rate. Specifically speaking, if the player's prize-winning skill is high (i.e., the player has won prizes at a high rate), the distance between a pair of pickup arms can be adjusted according to that high prize-obtaining skill so that the adjusted distance will make it difficult for the player to win a prize. On the other hand, if the player's prize-obtaining skill is low (i.e., the player has failed to win any prize or has won a prizes at a low rate), the distance between a pair of pickup arms can be adjusted according to that low prize-obtaining skill so that the adjusted distance will make it easier for the player to win a prize.

In the above-described configuration, the distance between a pair of pickup arms can be adjusted according to the player's operation of the operating unit. Therefore, it is possible to maintain the player's interest in the game and prevent loss due to excessive prize payout.

This invention's prize game apparatus can adjust the distance between a pair of pickup arms and another adjacent pair of pickup arms. Therefore, the prize-obtaining difficulty level can be changed depending on characteristics of the relevant prize. As a result, it is possible to prevent the prize game from becoming monotonous, and to maintain the player's interest in the game.

DETAILED DESCRIPTION OF THE INVENTION

The prize game apparatus according to a preferred embodiment of this invention is described below in detail, with reference to the attached drawings. The embodiment described below is for the purpose of describing this invention, but the invention is not limited only to that embodiment. Accordingly, this invention can be utilized in various ways unless the utilizations depart from the gist of the invention.

Figure 1:
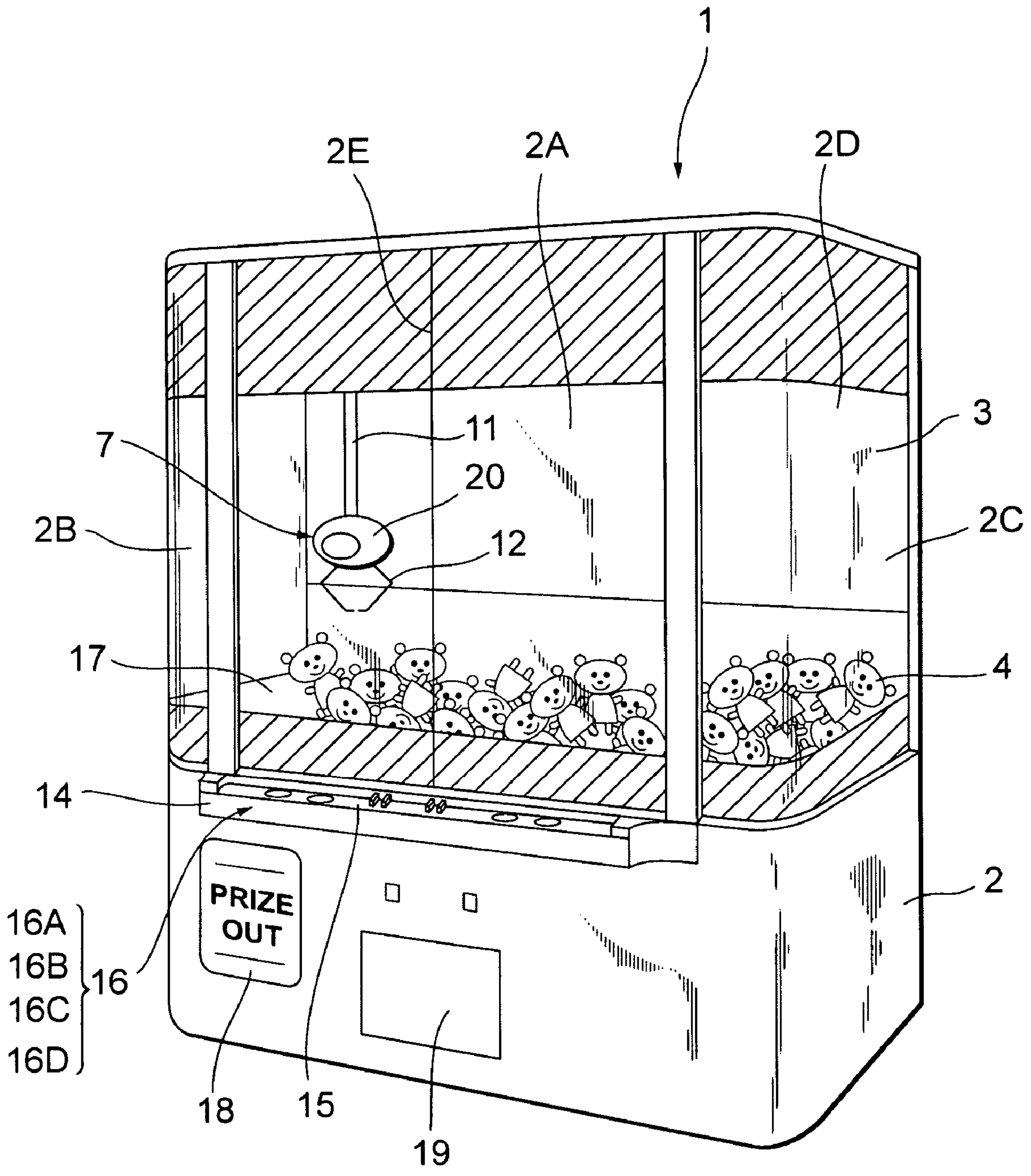
FIG. 1 is a perspective view showing the structure of a prize game apparatus equipped with a prize pickup device according to an embodiment of this invention.
Figure 2:
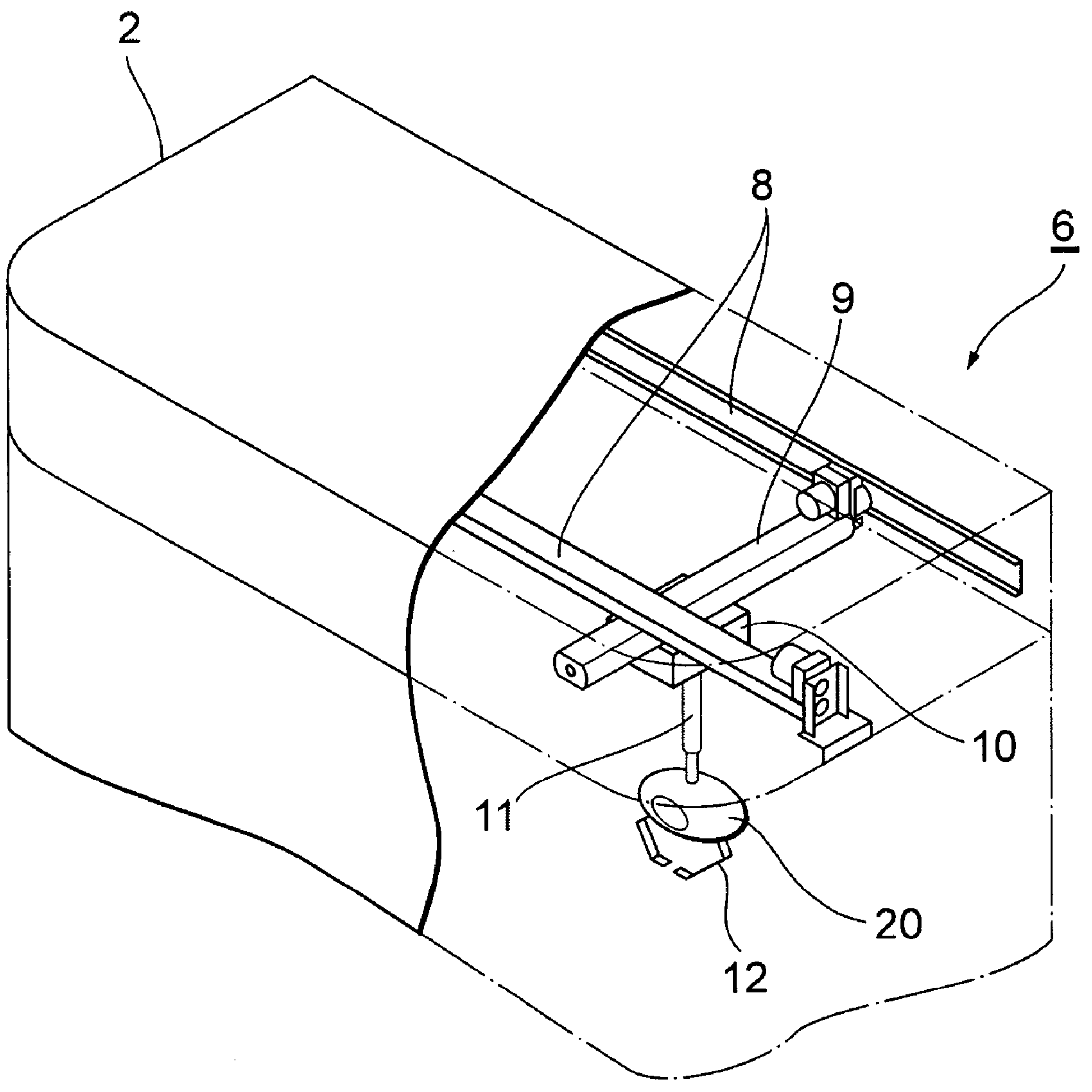
FIG. 2 is a perspective view showing the configuration of part of the prize game apparatus in FIG. 1 in the vicinity of a moving unit.
Figure 3:
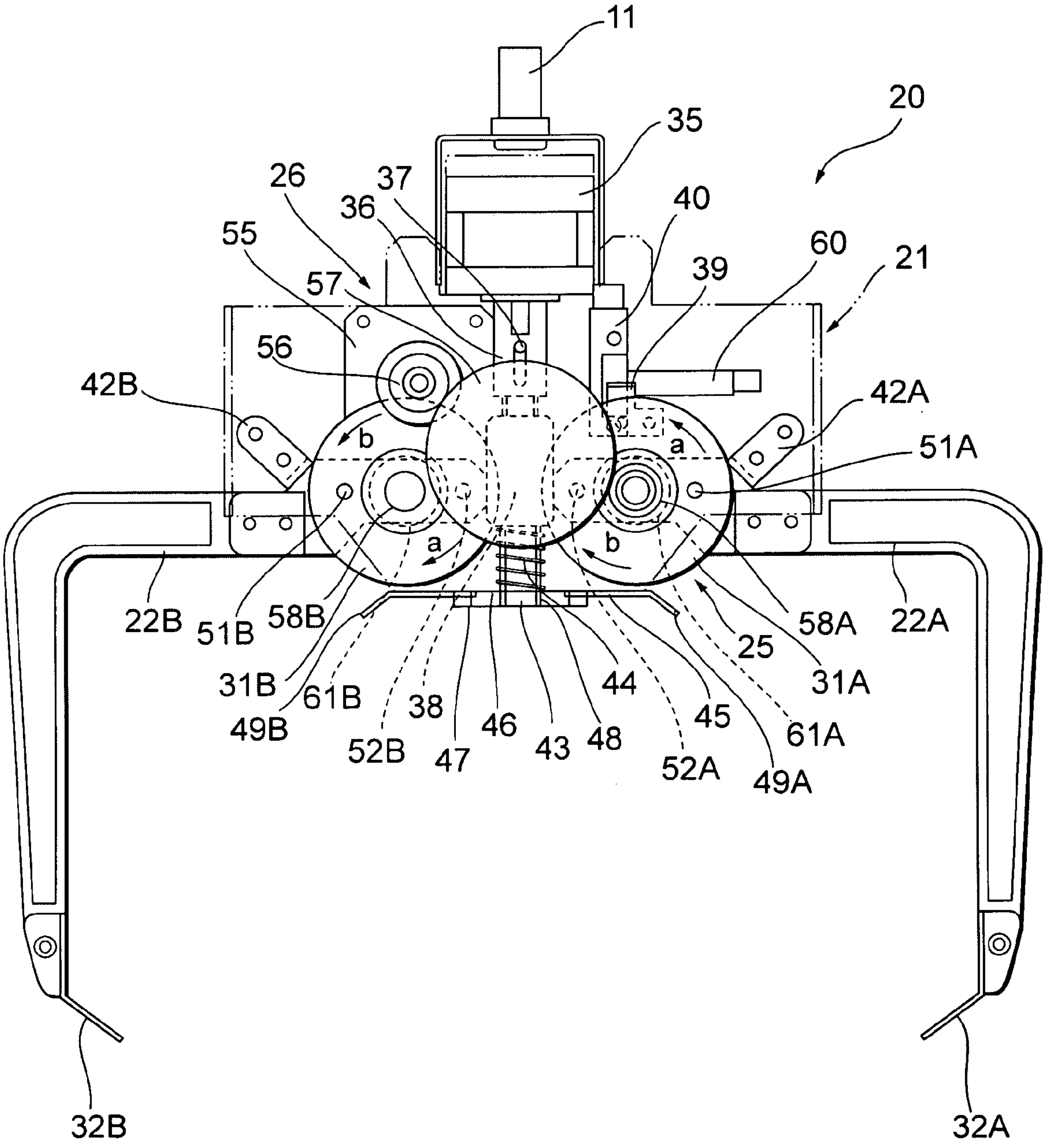
FIG. 3 is a schematic front view of a prize pickup device with its pickup arms open according to the embodiment of the invention.
Figure 4:
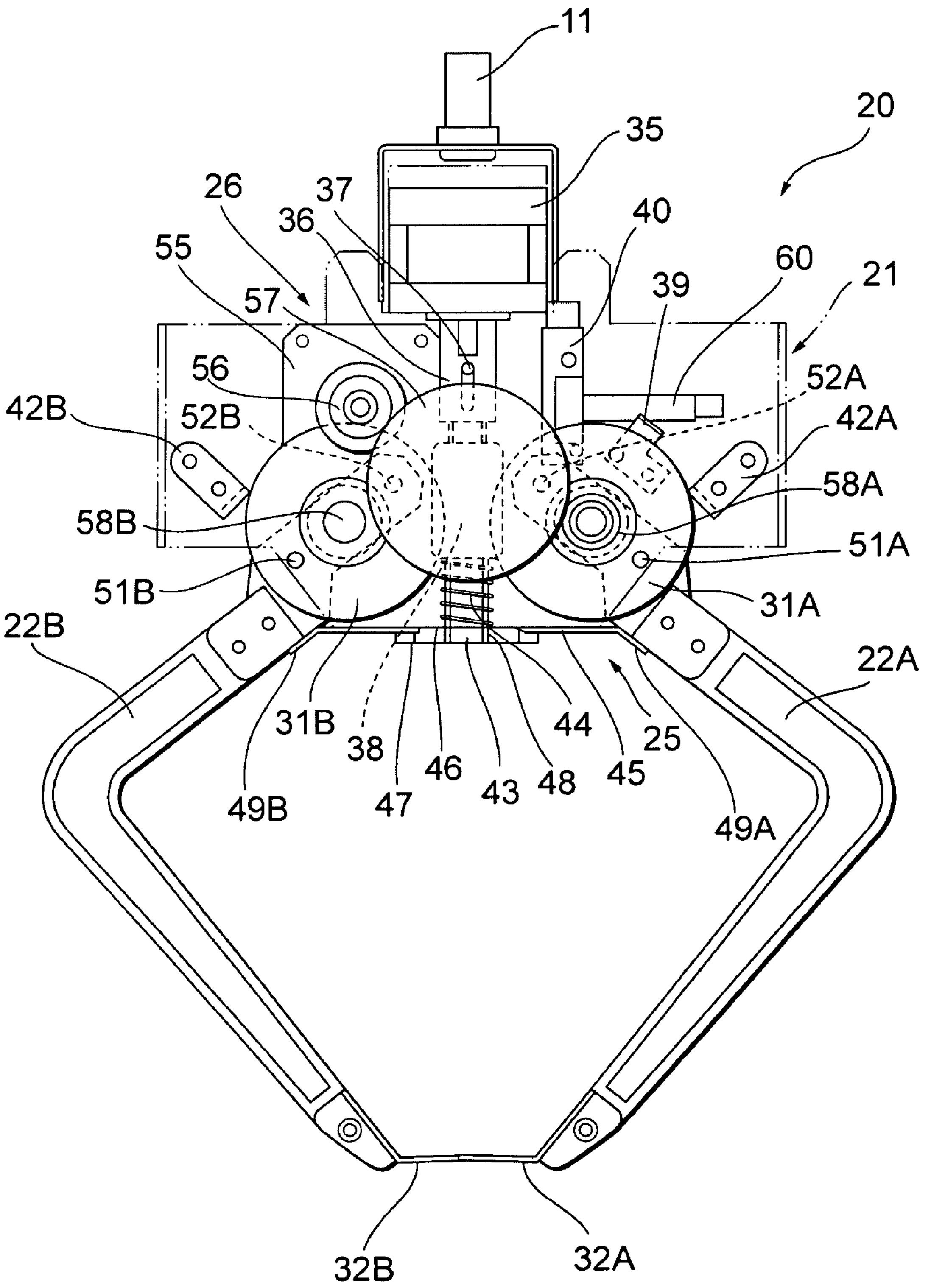
FIG. 4 is a schematic front view of the prize pickup device with its pickup arms closed according to the embodiment.
Figure 5:
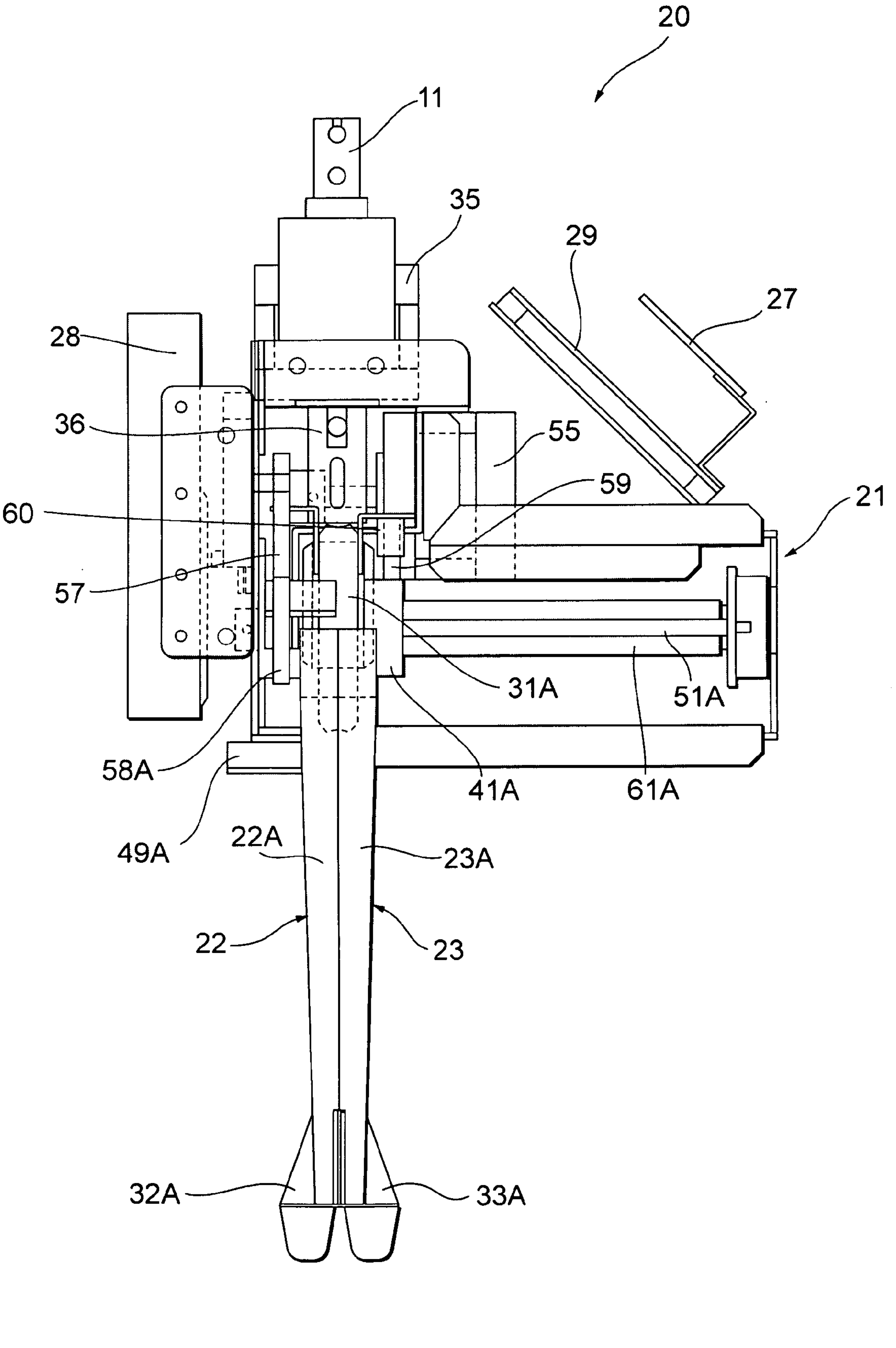
FIG. 5 is a schematic side view of the prize pickup device according to the embodiment.
Figure 6:
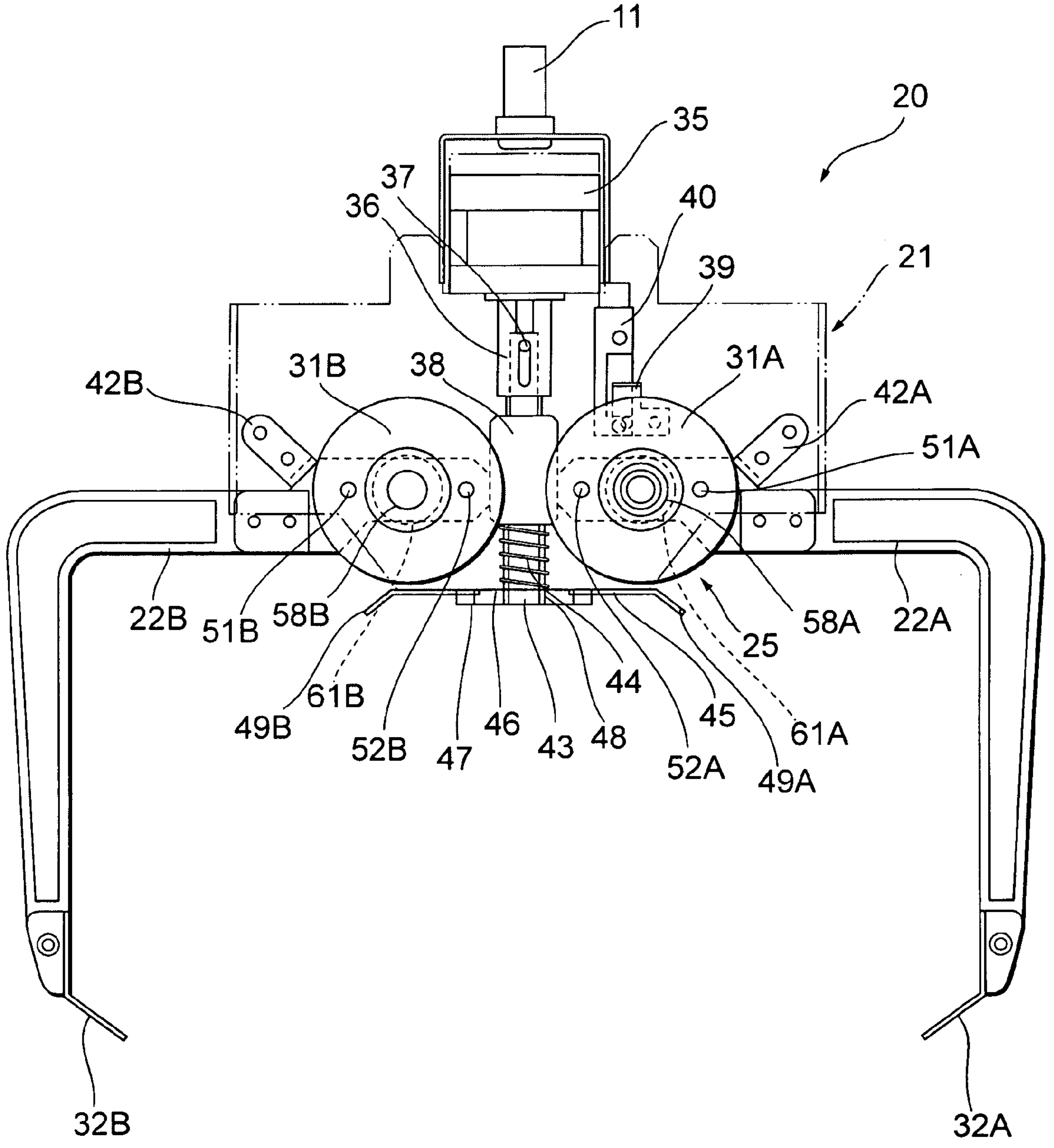
FIG. 6 is a front view of the main components necessary to open and close the pickup arms of the prize pickup device in FIG. 3, showing the state where the pickup arms are open.
Figure 7:
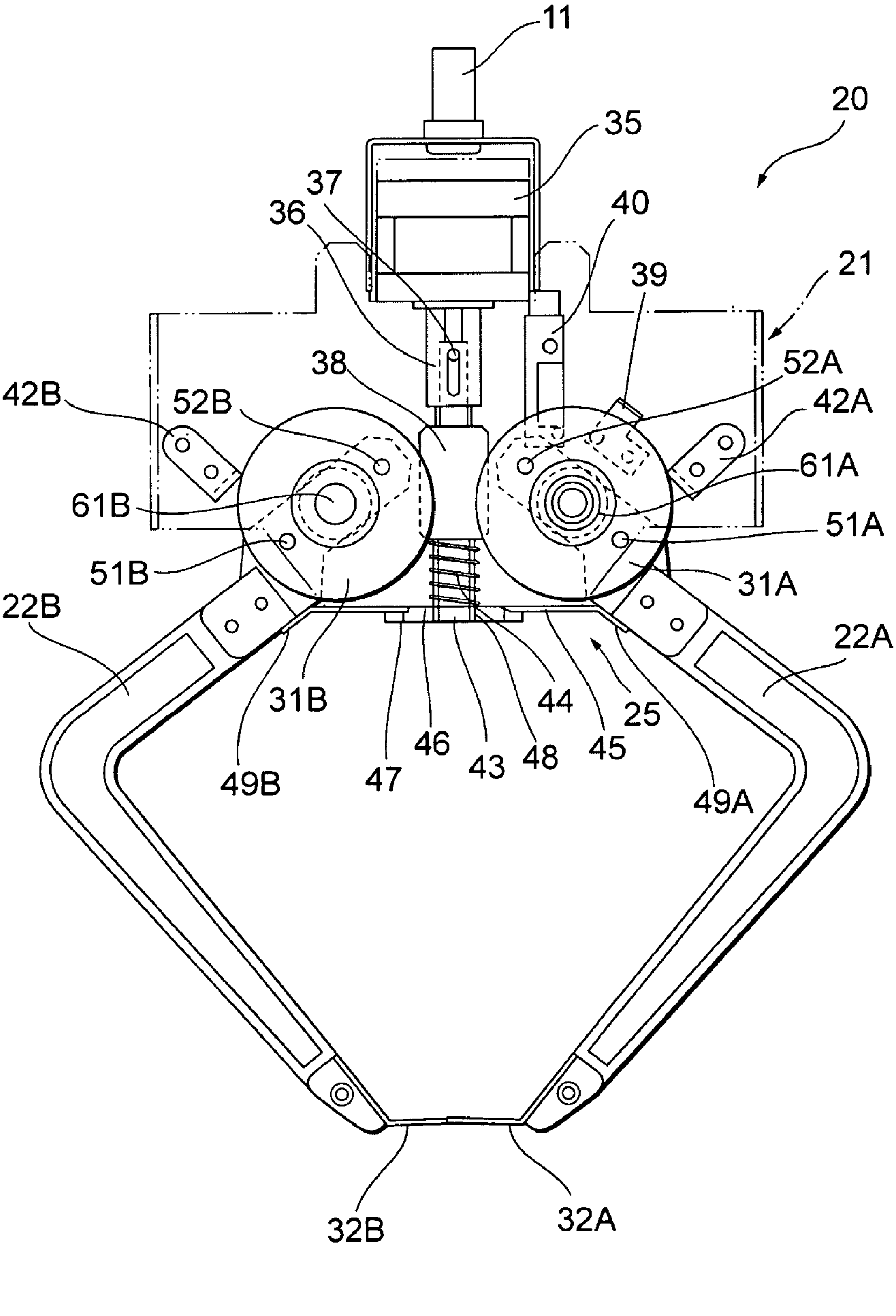
FIG. 7 is a front view of the main components necessary to open and close the pickup arms of the prize pickup device in FIG. 3, showing the state where the pickup arms are closed.
Figure 8:
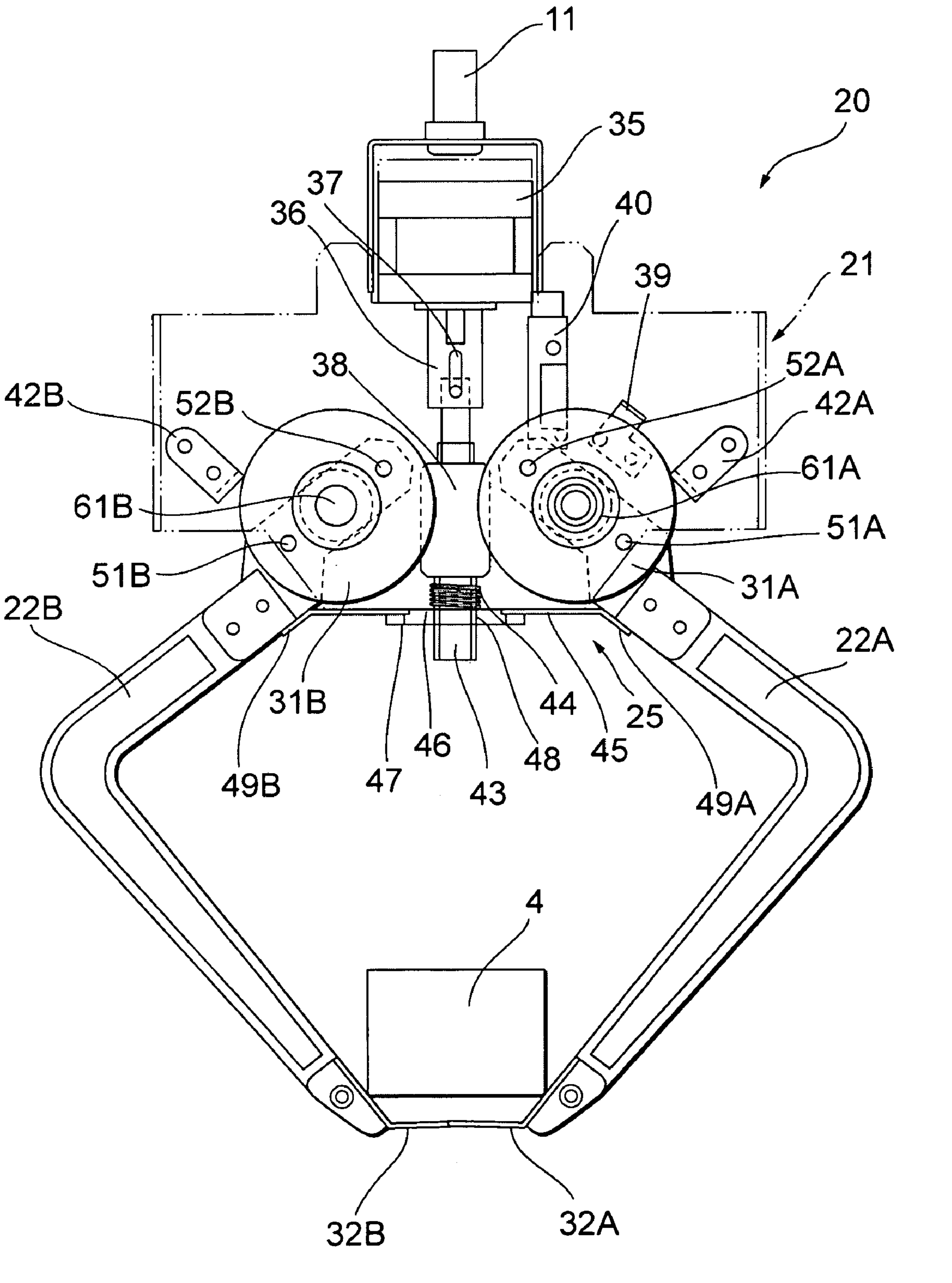
FIG. 8 is a front view of the main components necessary to open and close the pickup arms of the prize pickup device in FIG. 3, showing the state where the pickup arms have picked up a prize.
Figure 9:
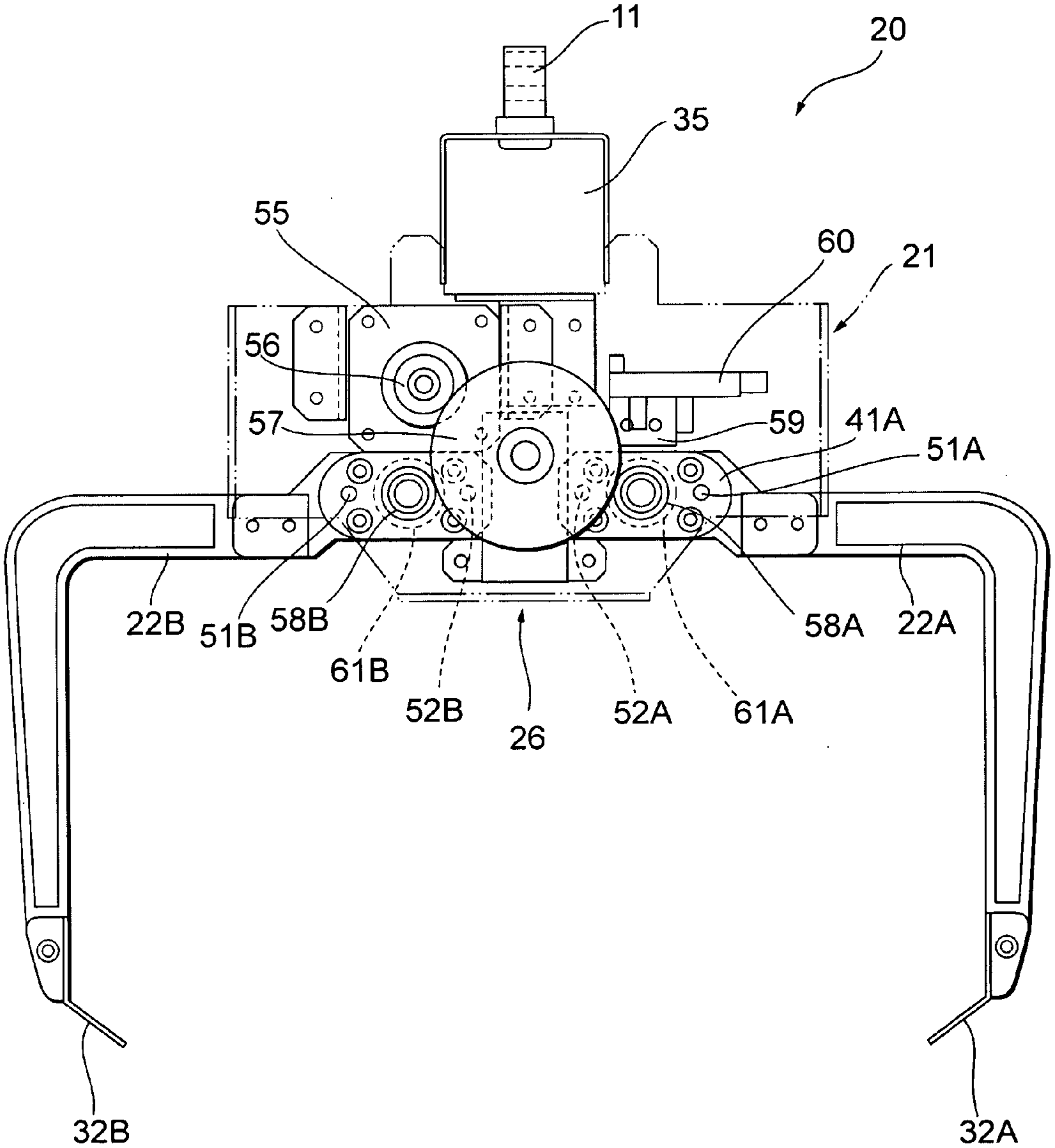
FIG. 9 is a front view of the main components necessary to move the pickup arms of the prize pickup device in FIG. 3.
Figure 10:
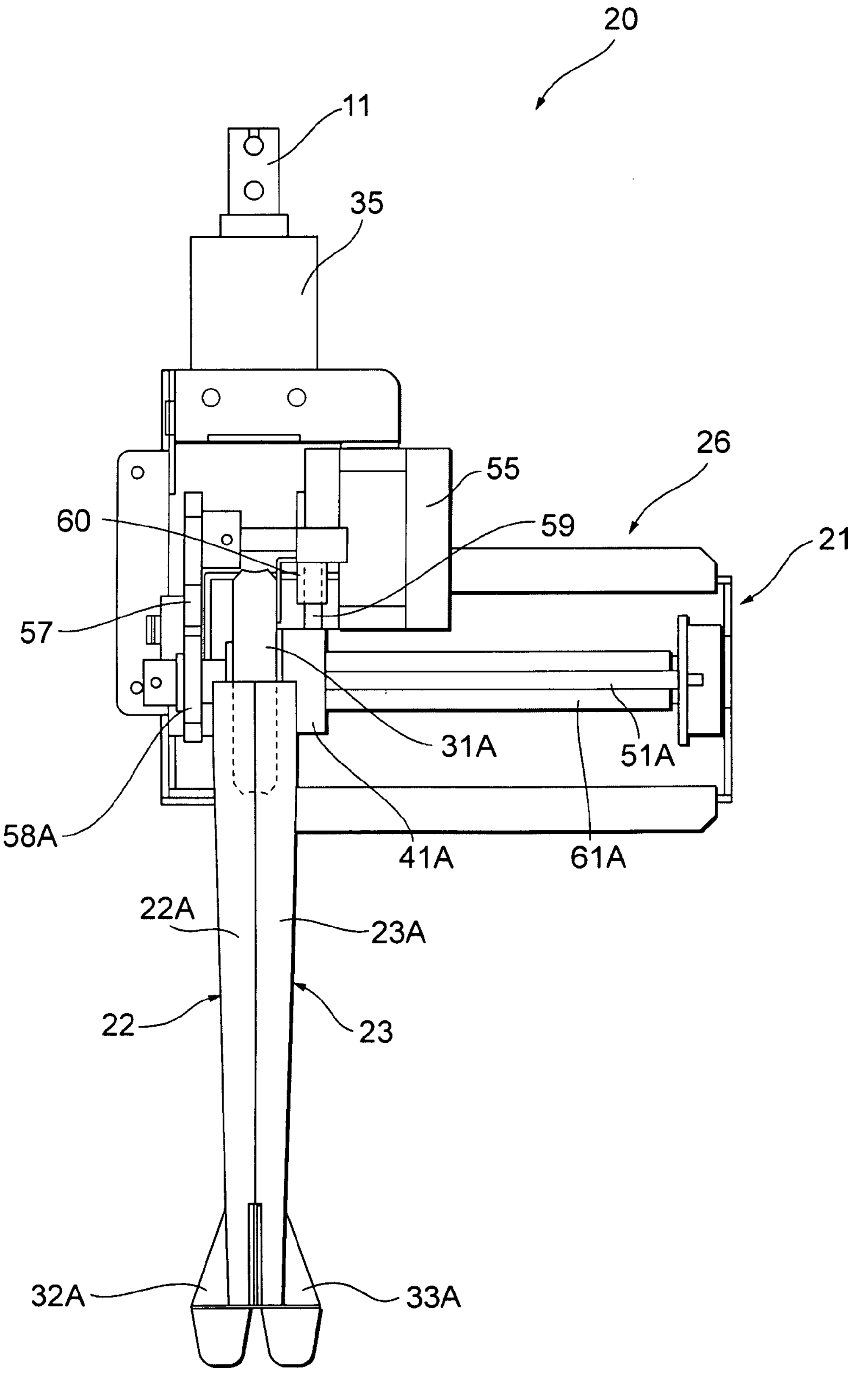
FIG. 10 is a side view of the prize pickup device in FIG. 9, showing the state prior to moving the pickup arms.
Figure 11:
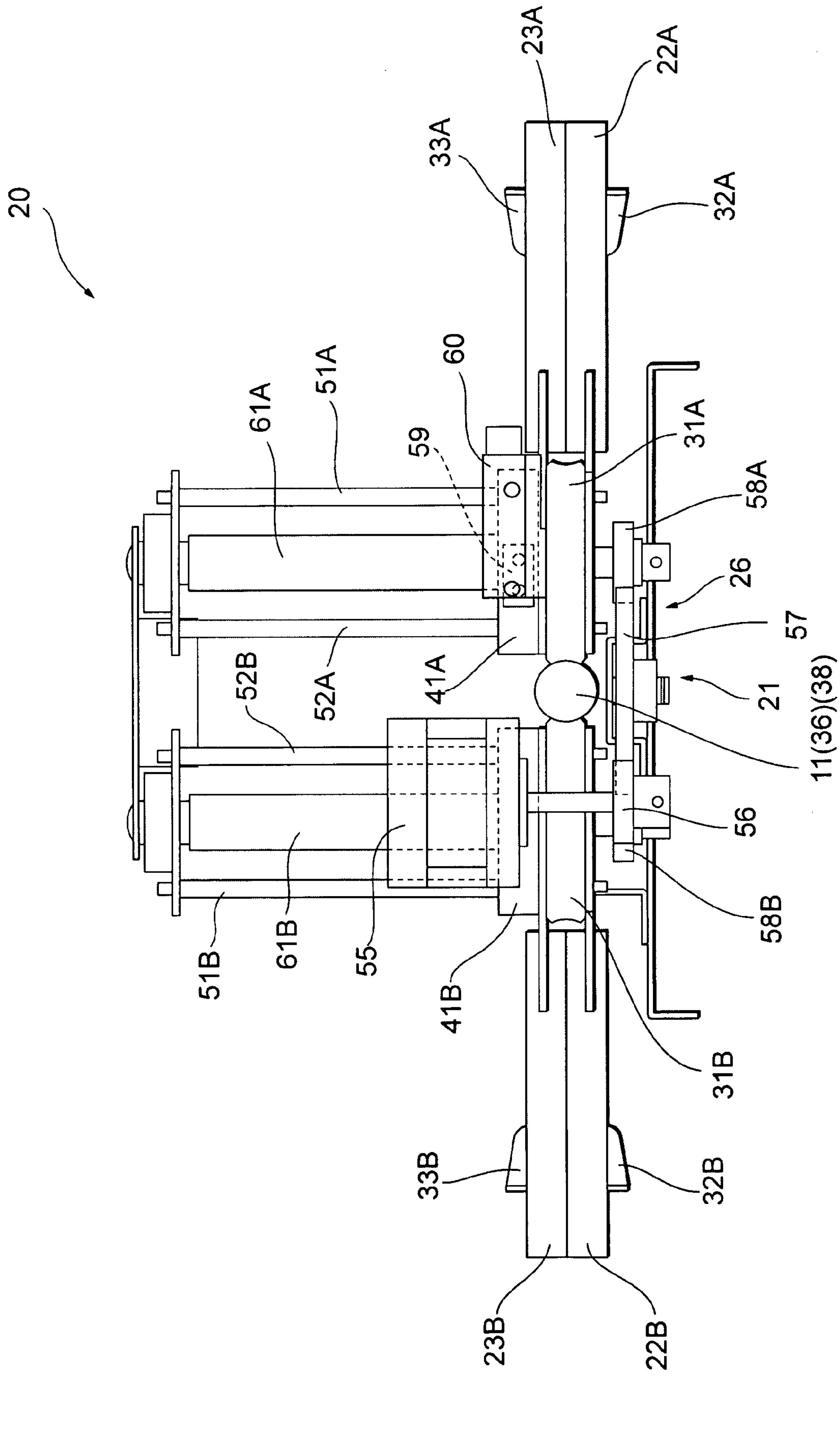
FIG. 11 is a plan view of the prize pickup device in FIG. 10.
Figure 12:
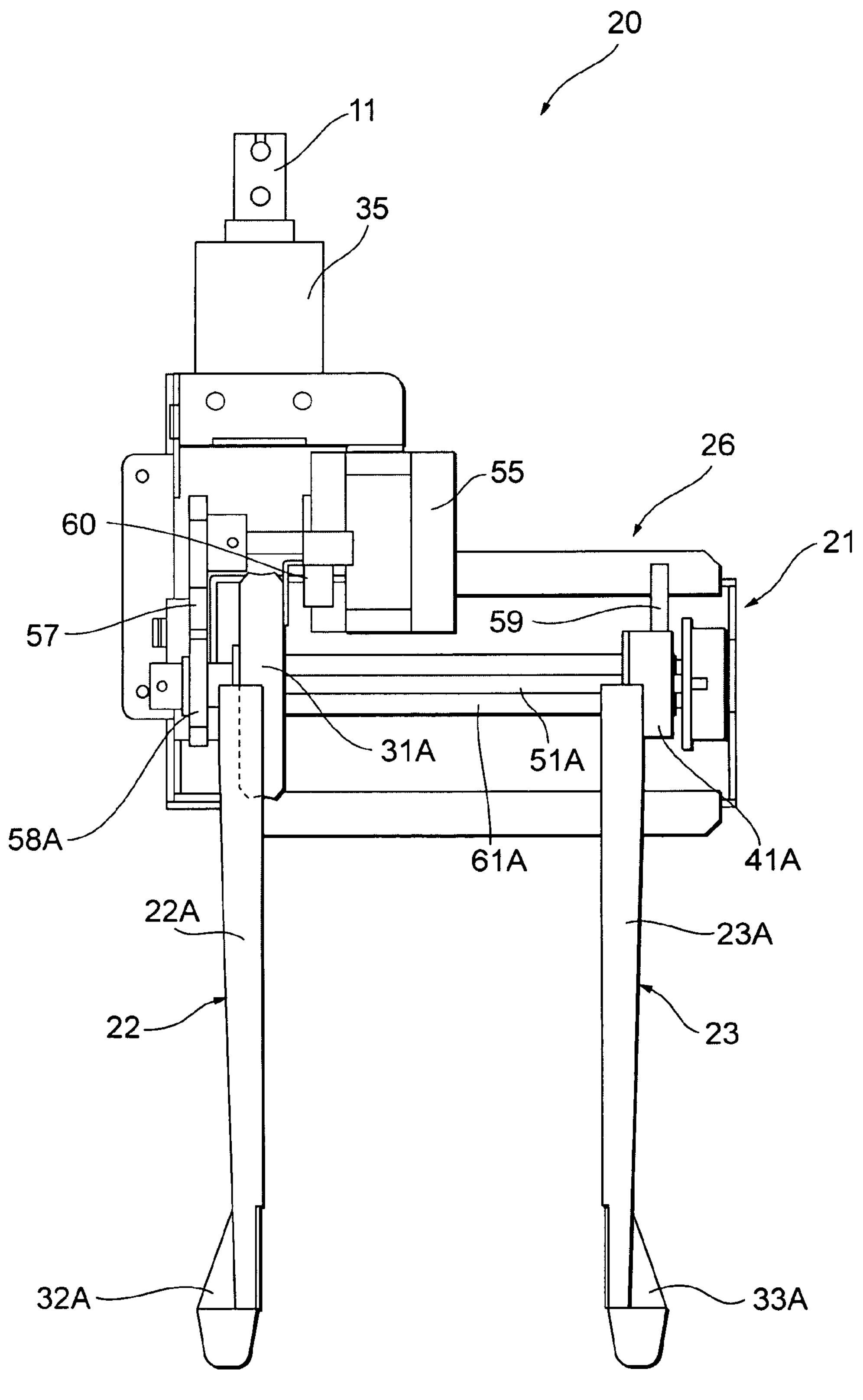
FIG. 12 is a side view of the prize pickup device in FIG. 9, showing the state where the pickup arms have been moved.
Figure 13:
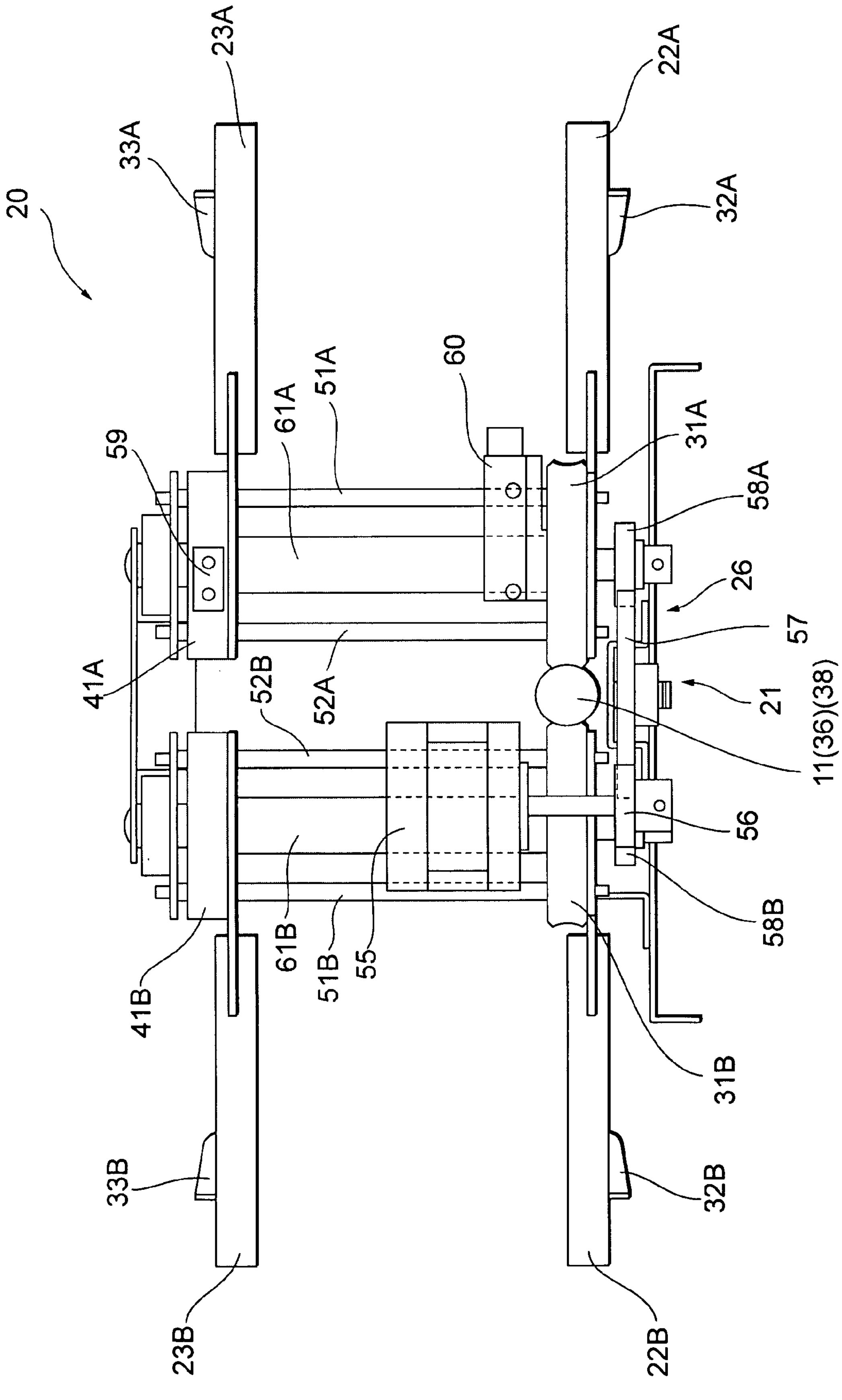
FIG. 13 is a plan view of the prize pickup device in FIG. 12.
Figure 14:
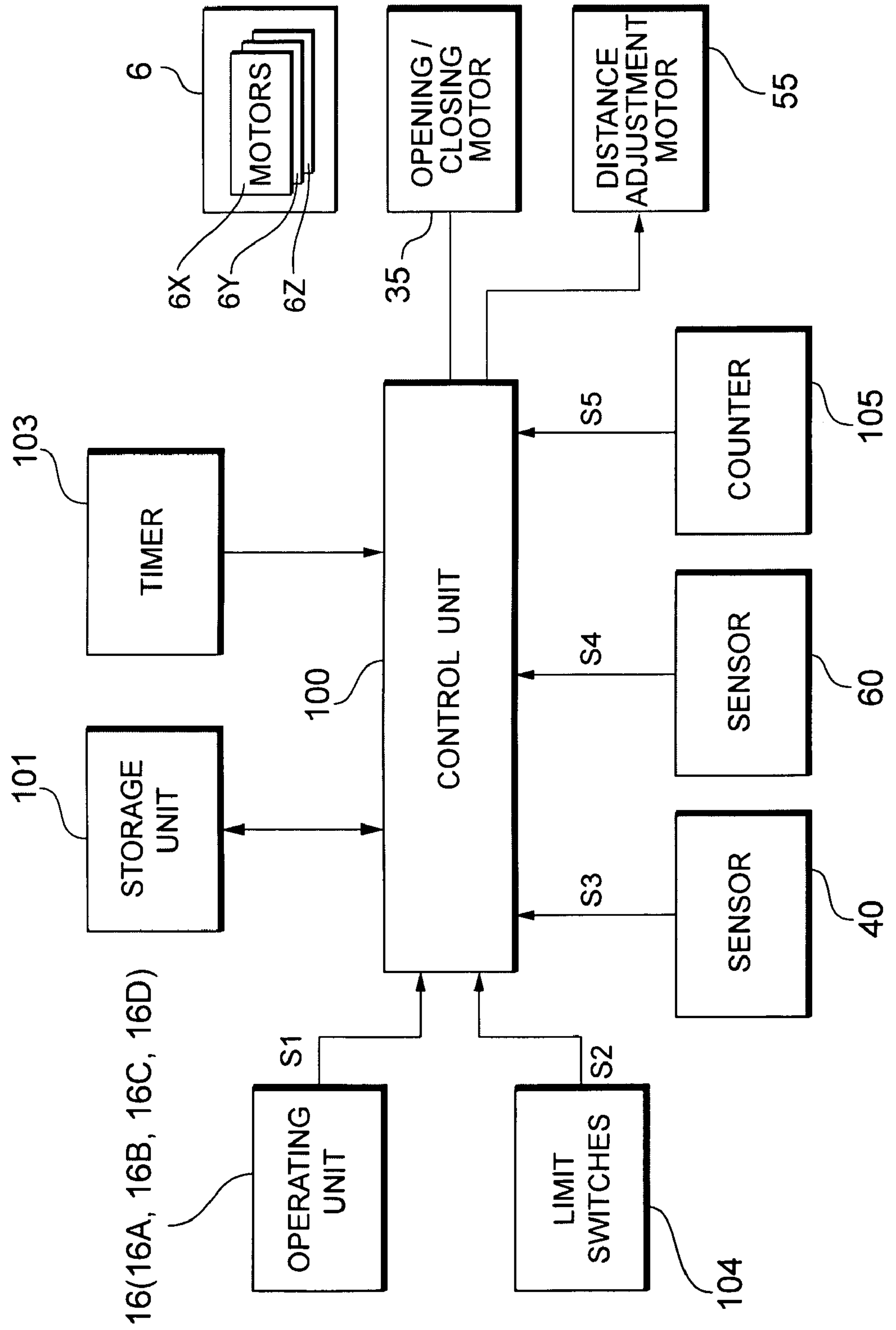
FIG. 14 is a block diagram illustrating the internal configuration of the prize game apparatus in FIG. 1.
Figure 15:
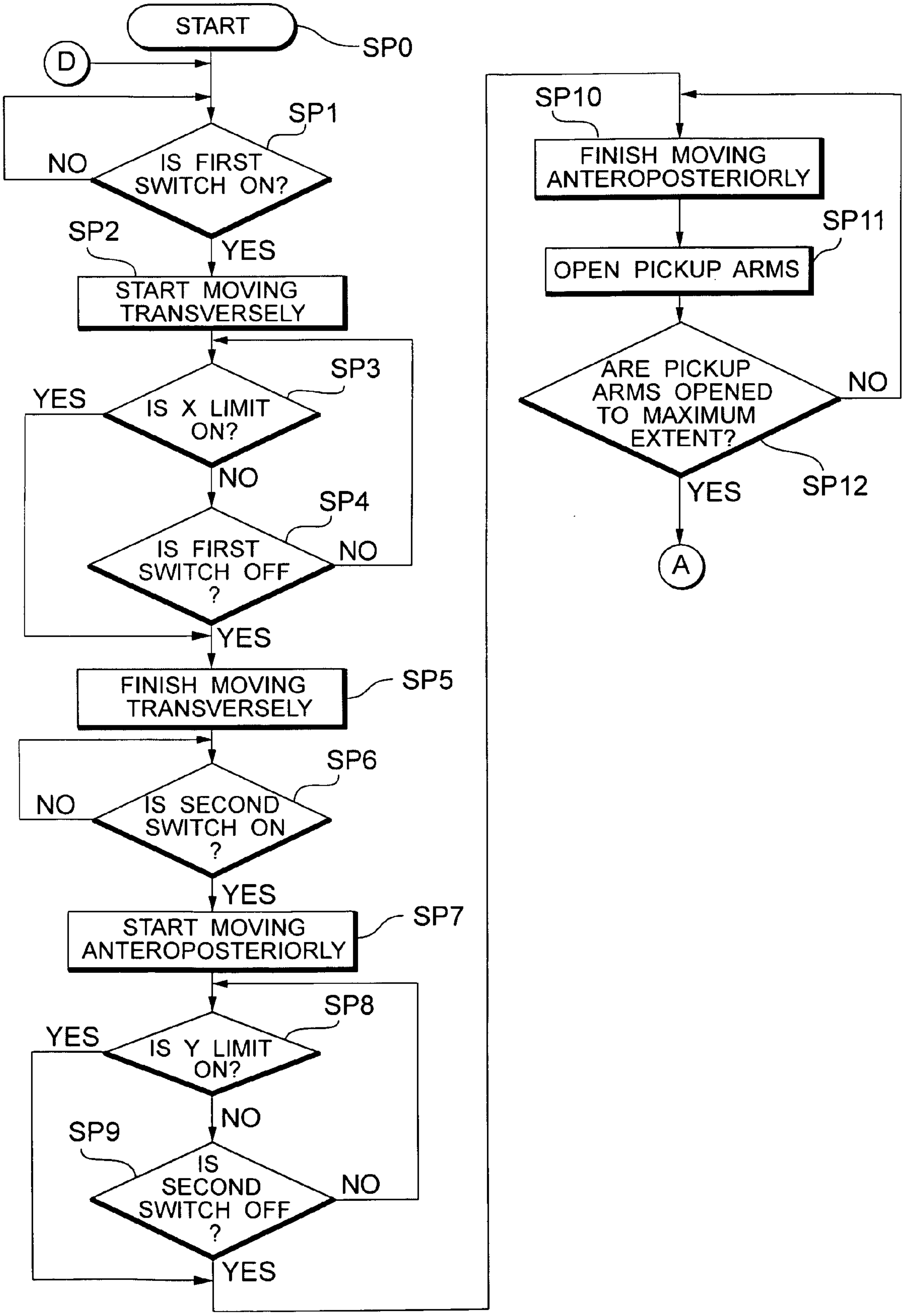
FIG. 15 is a flowchart explaining part of a processing sequence for running a prize game according to the embodiment of the invention.
Figure 16:
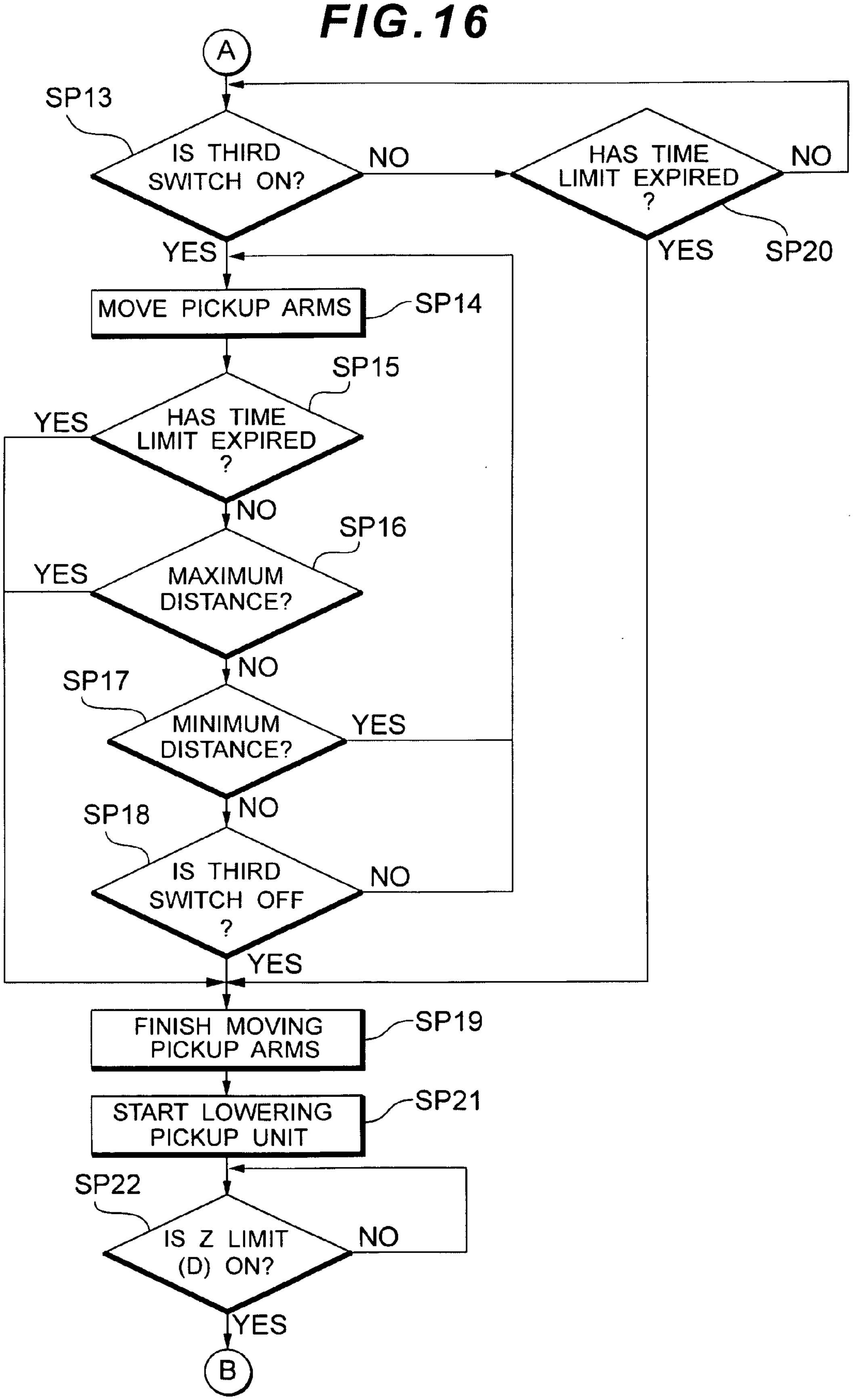
FIG. 16 is a flowchart explaining part of the processing sequence for running the prize game according to the embodiment.
Figure 17:
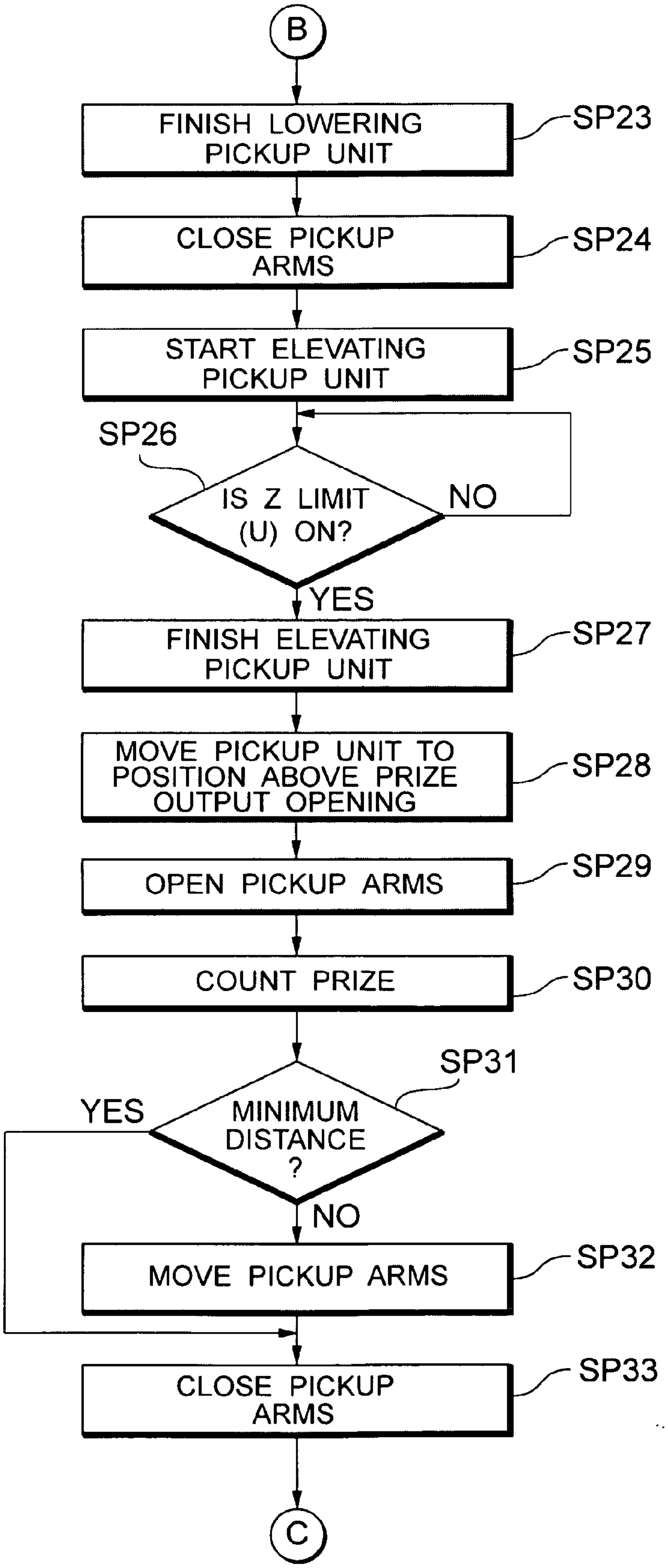
FIG. 17 is a flowchart explaining part of the processing sequence for running the prize game according to the embodiment.
Figure 18:
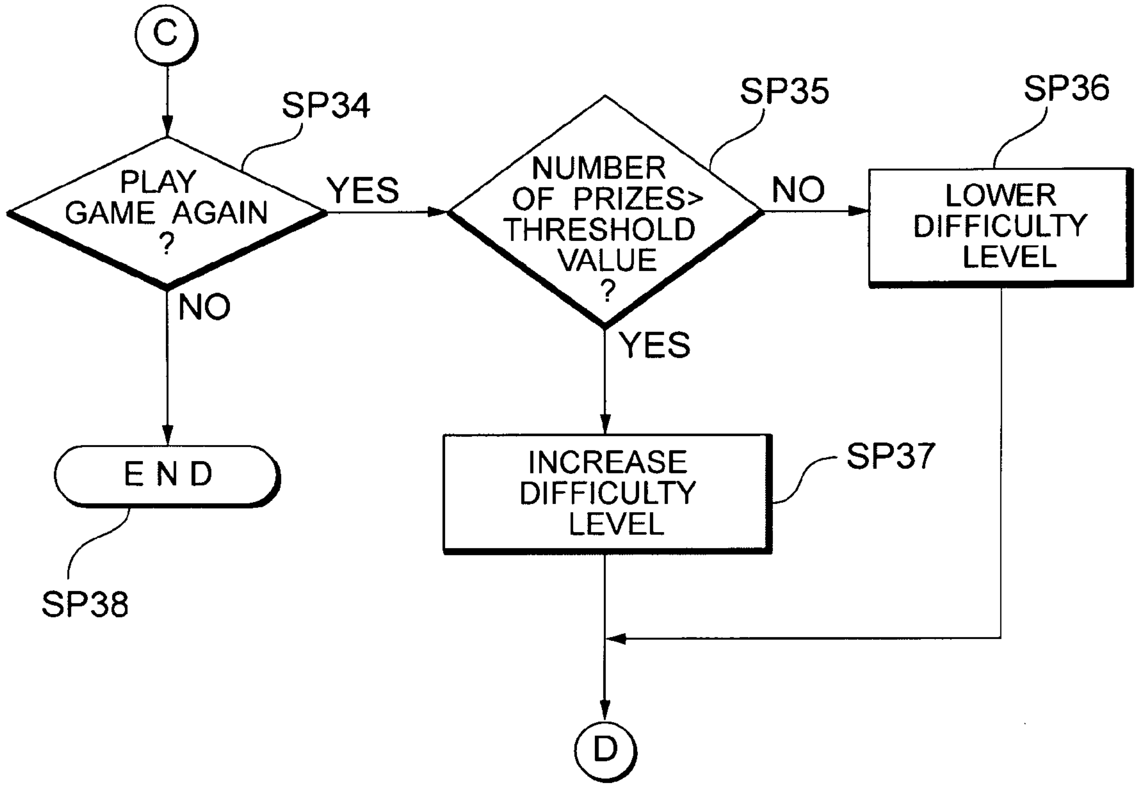
FIG. 18 is a flowchart explaining part of the processing sequence for running the prize game according to the embodiment.

FIG. 1 is a perspective view showing the structure of a prize game apparatus equipped with a prize pickup device according to an embodiment of this invention. FIG. 2 is a perspective view showing the configuration of part of the prize game apparatus in FIG. 1 in the vicinity of a moving unit. FIG. 3 is a schematic front view of a prize pickup device, and a component of the prize game apparatus according to the embodiment of the invention, showing the state where its pickup arms are opened. FIG. 4 is a schematic front view of the prize pickup device, a component of the prize game apparatus according to the embodiment, showing the state where its pickup arms are closed. FIG. 5 is a schematic side view of the prize pickup device, a component of the prize game apparatus according to the embodiment. FIG. 6 is a front view of the main components necessary to open and close the pickup arms of the prize pickup device in FIG. 3, showing the state where the pickup arms are opened. FIG. 7 is a front view of the main components necessary to open and close the pickup arms of the prize pickup device in FIG. 3, showing the state where the pickup arms are closed. FIG. 8 is a front view of the main components necessary to open and close the pickup arms of the prize pickup device in FIG. 3, showing the state where the pickup arms has picked up a prize. FIG. 9 is a front view of the main components necessary to move the pickup arms of the prize pickup device in FIG. 3. FIG. 10 is a side view of the prize pickup device in FIG. 9, showing the state prior to moving the pickup arms. FIG. 11 is a plan view of the prize pickup device in FIG. 10. FIG. 12 is a side view of the prize pickup device in FIG. 9, showing the state where the pickup arms have been moved. FIG. 13 is a plan view of the prize pickup device in FIG. 12. FIG. 14 is a block diagram illustrating the internal configuration of the prize game apparatus in FIG. 1.

FIGS. 3 and 4 illustrate only the main components of the prize pickup device, which is an element of the prize game apparatus, without showing other components, in order to clearly show the relationship between the components necessary to open and close the pickup arms, and the components necessary to move the pickup arms of the prize pickup device.

As shown in FIGS. 1 and 2, the prize game apparatus 1 according to this embodiment includes a generally box-shaped housing 3 provided on a generally rectangular parallelepiped platform 2. The front face 2A and side faces 2B and 2C of the housing 3 are made of transparent resin or glass plate members so that a player can see prizes 4 placed inside the housing 3. The back face 2D of the housing 3 is made of a mirror plate member or a decorated plate member. A door 2E (for example, a sliding door or double doors) is provided on the front face 2A of the housing 3 so that a store clerk can open the door 2E and place the prizes 4, such as stuffed character toys or other miscellaneous goods, in the housing 3.

Furthermore, in the upper part of the housing 3, there is a prize pickup device 20 for picking up a prize 4, and a moving unit 6 (see FIG. 2) for moving the prize pickup device 20 within the housing 3 according to a player's operation.

As shown in FIG. 2, the moving unit 6 includes: a pair of fixed transverse rails 8 located and fixed in parallel with the transverse direction (X direction) of the housing 3 in its inner upper area; a movable anteroposterior rail 9 positioned in parallel with the anteroposterior direction (Y direction) of the housing 3 and attached to the fixed transverse rails in such a manner that the movable anteroposterior rail 9 can freely slide along the fixed transverse rails 8; a prize-obtaining unit base 10 attached to the movable anteroposterior rail 9 in such a manner that the prize-obtaining unit base 10 can slide along the movable anteroposterior rail 9; and an extensible supporting member 11 attached to the prize-obtaining unit base 10 in parallel with the vertical direction (Z direction) of the housing 3. The prize pickup device 20 is attached to the lower end of this supporting member 11.

The movable anteroposterior rail 9 of the moving unit 6 can be moved transversely (in the X direction) along the fixed transverse rails 8 by rotational output from an X-direction motor 6X (see FIG. 14). The prize-obtaining unit base 10 can be moved in the anteroposterior direction (Y direction) along the movable anteroposterior rail 9 by rotational output from a Y-direction motor 6Y (see FIG. 14).

Moreover, the supporting member 11 can be extended or contracted by rotational output from a Z-direction motor 6Z (see FIG. 14). This extension/contraction makes the prize pickup device 20 move up and down (in the Z direction). Consequently, the prize-obtaining unit 7 is designed so that the prize pickup device 20 can be moved to a desired position in the housing 3 by operating the X-direction motor 6X, the Y-direction motor 6Y, and the Z-direction motor 6Z of the moving unit 6 as desired.

A console 14 is provided on the platform 2. There are coin slots 15 on the console 14 for inserting coins to play the game. The console 14 also includes an operating unit 16 consisting of: a first control switch 16A for a player to input an operational instruction to move the prize pickup device 20 in the transverse direction (X direction), to a desired position during a game; a second control switch 16B for the player to then input an operational instruction to move the prize pickup device 20 in the anteroposterior direction (Y direction), to a desired position; a distance adjustment switch 16C for adjusting the distance between pickup arm pairs 22 and 23 (see FIGS. 5, 10, and 12) of the prize pickup device 20 described later in detail; and a game retry switch 16D to push when the player wants to continue (or retry) the game. Incidentally, this operating unit 16 can be structured as an operating means such as a joystick.

Moreover, a prize delivery opening 18 connected to a tubular prize guide passage 17 placed at a specified position in the housing 3 is made on the front face of the platform 2. Accordingly, a prize 4 picked up and transported by the prize pickup device 20 and dropped into the prize guide passage 17 as described later can be taken out of the prize delivery opening 18.

Furthermore, a door 19 is provided on the front face of the platform 2. Inside this door 19, there is a switch panel (not shown) and/or a liquid crystal panel (not shown) for making various settings for the prize game apparatus 1, so that an administrator can make desired settings for various matters, while visually checking the display content of the switch panel and/or the liquid crystal panel.

The prize pickup device 20 includes: a pickup unit 21 connected via the supporting member 11 to the moving unit 6; two pairs of pickup arms 22 and 23 (FIGS. 5, 10, and 12) attached to the pickup unit 21; an opening/closing unit 25 that is contained in the pickup unit 21 and serves to open and close the pickup arm pairs 22 and 23; and a distance adjustment unit 26 that is contained in the pickup unit 21 and serves to adjust the distance between the pairs of pickup arms 22 and 23 by moving one pair of pickup arms 23.

The pickup unit 21 is equipped with: a drive board 27 on which, for example, a control circuit for controlling driving of the prize pickup device 20 is mounted; a liquid crystal monitor 28 where images can be displayed as desired; and an image display board 29 on which, for example, a control circuit for controlling images to be displayed on the liquid crystal monitor 28 is mounted. The pickup unit 21 also includes: the two pairs of pickup arms 22 and 23; the opening/closing unit 25 for opening and closing the two pairs of pickup arms 22 and 23; and the distance adjustment unit 26 for adjusting the distance between the pickup arm pairs 22 and 23.

Opening-action locking members 42A and 42B that can come in contact with the pickup arms 22A and 22B respectively are placed near and outside worm wheels 31A and 31B of the pickup unit 21. In the bottom face 45 of the pickup unit 21, there is a hole 46 through which a slider 43, a component of the opening/closing unit 25 described later in detail, can pass. Furthermore, a hole 48, concentric with the hole 46, and through which the slider 43 can pass, is formed on the underside of the bottom face 45; and a slide guide 47 for guiding the slider 43 to move is attached to the underside of the bottom face 45. This slide guide 47 prevents the slider 43 and a coil spring 44, a component of the opening/closing unit 25 described later in detail, from rotating. Moreover, closing-action locking members 49A and 49B that can come in contact with the pair of pickup arms 22 respectively are placed at the bottom face 45 of the pickup unit 21.

The pair of pickup arms 22 consists of pickup arms 22A and 22B. Each pickup arm 22A/22B is generally in the shape of the letter L. The base ends of the pickup arms 22A and 22B are respectively connected to worm wheels 31A and 31B, components of the opening/closing unit 25 described later in detail. Claws 32A and 32B are attached to the open ends of the pickup arms 22A and 22B respectively.

The pair of pickup arms 23 consists of pickup arms 23A and 23B. Each pickup arm 23A/23B is generally in the shape of the letter L just like the pickup arms 22A and 22B. The base ends of the pickup arms 23A and 23B are respectively connected to feed nuts 41A and 41B, components of the opening/closing unit 25 described later in detail, as well as components of the distance adjustment unit 26. Claws 33A and 33B are attached to the open ends of the pickup arms 23A and 23B respectively.

The opening/closing unit 25 includes: an opening/closing motor 35; a coupling 36 connected to the opening/closing motor 35; a worm gear 38 connected via a joint pin 37 to the coupling 36; the slider 43 attached to the lower end of the worm gear 38; the worm wheels 31A and 31B that are placed on both sides of the worm gear 38 and engage with the worm gear 38; a detection plate 39 attached to the worm wheel 31A; a sensor 40 for sensing the detection plate 39; the coil spring 44 provided on the slider 43; the feed nuts 41A and 41B to which the base ends of the pickup arms 23A and 23B are secured; and guide shafts 51A, 51B, 52A, and 52B, each with one end secured to the worm wheels 31A and 31B respectively, and their opposite end secured to the feed nuts 41A and 41B respectively.

The opening/closing motor 35 is connected to a control unit 100 (see FIG. 14) including a control circuit and other elements mounted on the drive board 27.

The coupling 36 is rotated by the opening/closing motor 35. This rotation is transmitted to the worm gear 38 connected via the joint pin 37. Consequently, the worm gear 38 rotates, thereby rotating the worm wheels 31A and 31B placed on the right and left sides of the worm gear 38 as shown in FIG. 3. When this happens, the sensor 40 senses the detection plate 39.

When the opening/closing motor 35 is driven to rotate the worm gear 38 in one direction (for example, clockwise), the worm wheel 31A rotates in the direction indicated by arrow “a” in FIG. 3 and the worm wheel 31B rotates in the direction indicated by arrow “b” in FIG. 3. These rotations make the pickup arms 22A and 22B perform the opening action until the sensor 40 senses the detection plate 39. When the sensor 40 senses the detection plate 39, the pickup arms 22A and 22B stop rotating out and become fully opened as shown in FIGS. 3, 6, and 9. At the same time, the pickup arms 22A and 22B come into contact with the opening-action locking members 42A and 42B. When this happens, the guide shafts 51A and 52A transmit the rotations of the worm wheel 31A to the feed nut 41A, and the guide shafts 51B and 52B transmit the rotations of the worm wheel 31B to the feed nut 41B. Then, the pickup arms 23A and 23B also perform the opening action (rotation) in synchronization with and in the same manner as the pickup arms 22A and 22B.

On the other hand, if the worm gear 38 is rotated in the direction (for example, counterclockwise) opposite the above-mentioned direction, the worm wheel 31A rotates in the direction indicated by arrow “b” in FIG. 3 and the worm wheel 31B rotates in the direction indicated by arrow “a” in FIG. 3. These rotations make the pickup arms 22A and 22B perform the closing action until the pickup arms 22A and 22B come into contact with the closing-action locking members 49A and 49B. When the pickup arms 22A and 22B come in contact with the closing-action locking members 49A and 49B, the pickup arms 22A and 22B are closed as shown in FIGS. 4 and 7. When this happens, the guide shafts 51A and 52A transmit the rotations of the worm wheel 31A to the feed nut 41A, and the guide shafts 51B and 52B transmit the rotations of the worm wheel 31B to the feed nut 41B. Then, the pickup arms 23A and 23B also perform the closing action (rotation) in synchronization with and in the same manner as the pickup arms 22A and 22B.

When the pickup arms 22A, 22B, 23A and 23B, performing the closing action, come into contact with the closing-action locking member 49A and 49B, the pickup arms 22A, 22B, 23A and 23B stop moving and the worm wheels 31A and 31B stop rotating. If the opening/closing motor 35 further rotates the worm gear 38 in the above-described state, the worm gear 38 moves downward (generally vertically), as shown in FIG. 8, as guided by the worm wheels 31A and 31B, the joint pin 37, and a housing (not shown) formed in the pickup unit 21 for the worm gear 38, and the slider 43 then passes through the holes 46 and 48. This motion compresses the coil spring 44 (see FIG. 8) and applies force to the pickup arms 22A and 22B in the their closing direction. This applied force gives the pickup arms 22A, 22B, 23A, and 23B the power to pick up (or grasp) a prize 4 (shown in a rectangular shape in FIG. 8).

By changing (or adjusting) the mounting position of the worm gear 38 (the mounting position relative to the coupling 6 in this embodiment), the extension/contraction length of the coil spring 44 can be changed (or adjusted) although the stroke of the worm gear 38 itself does not change. Changing (or adjusting) the extension/contraction length of the coil spring 44 can adjust the grasping power of the pickup arms 22A, 22B, 23A, and 23B.

The distance adjustment unit 26 includes: a distance adjustment motor 55; a drive gear 56 connected to the distance adjustment motor 55; a transmission gear 57 that rotates in engagement with the drive gear 56; two feed gears 58A and 58B that are placed on the right and left sides of the transmission gear 57 and rotate in engagement with the transmission gear 57; feed screws 61A and 61B connected to the feed gears 58A and 58B respectively; feed nuts 41A and 41B that engage with feed screws 61A and 61B respectively and are connected to the pickup arms 23A and 23B respectively; a movement detection plate 59 mounted on the feed nut 41A; and a sensor 60 for sensing the movement detection plate 59.

The distance adjustment motor 55 is connected to the control unit 100 (see FIG. 14) that includes the control circuit and other elements mounted on the drive board 27.

The transmission gear 57 is located closer to the liquid crystal monitor 28 than to the worm gear 38 and engages with the feed gears 58A and 58B on the right and left sides of the transmission gear 57 as shown in FIG. 9. The feed screw 61A coupled to the feed gear 58A extends along the moving direction of the pickup arms 23A and 23B and in parallel with the guide shafts 51A and 52A, and is positioned between the guide shafts 51A and 52A as shown in FIGS. 11 and 13.

Also, the feed screw 61B coupled to the feed gear 58B extends along the moving direction of the pickup arms 23A and 23B and in parallel with the guide shafts 51B and 52B, and is positioned between the guide shafts 51B and 52B.

Each feed nut 41A/41B has a female screw engaging with a male screw formed on the feed screw 61A/61B, and converts the rotational motion of the feed screw 61A/61B into linear motion so that it can move along the feed screw 61A/61B. The top ends of the guide shafts 51A and 52A are secured to the feed nut 41A, while the top ends of the guide shafts 51B and 52B are secured to the feed nut 41B. Accordingly, as the worm wheels 31A and 31B rotate, the feed nuts 41A and 41B rotate together with, and in the same manner as, the worm wheels 31A and 31B.

When the distance adjustment motor 55 is driven to rotate the drive gear 56 in one direction (for example, clockwise), the transmission gear 57 rotates and transmits this rotation to the feed gears 58A and 58B. When the feed gears 58A and 58B rotate, the feed screws 61A and 61B rotate and then the feed nuts 41A and 41B move along the feed screws 61A and 61B away from their original positions (where the pickup arms 22A and 22B are in contact with or located very close to the pickup arms 23A and 23B as shown in FIG. 11). This movement of the feed nuts 41A and 41B causes the pickup arms 23A and 23B to move away from the pickup arms 22A and 22B. Incidentally, the sensor 60 senses the movement detection plate 59 when the pickup arms 23A and 23B are located at their original positions.

On the other hand, in order to move (or return) the pickup arms 23A and 23B back to their original positions, the distance adjustment motor 55 should only be driven to rotate the drive gear 56 in the direction (for example, counterclockwise) opposite the above-described direction. When the sensor 60 senses the movement detection plate 59, the pickup arms 23A and 23B stop moving (i.e., they have returned to their original positions).

Next, the internal configuration of the prize game apparatus 1 will be described below. As shown in FIG. 14, the prize game apparatus 1 according to this embodiment includes: the control unit 100 that is configured as a microcomputer and includes a CPU (Central Processing Unit), ROM (Read Only Memory), and RAM (Random Access Memory); a storage unit 101 composed of, for example, nonvolatile memory; and a timer 103 for measuring time.

When a player pushes any of the first control switch 16A, the second control switch 16B, the distance adjustment switch 16C, and the game retry switch 16D on the console 14 (see FIG. 1) during a game, the control unit 100 receives a corresponding manipulation signal S1 from the first control switch 16A, the second control switch 16B, the distance adjustment switch 16C, or the game retry switch 16D.

The moving unit 6 has: a transverse position detector for detecting the position of the prize pickup device 20 in the transverse direction; an anteroposterior position detector for detecting the position of the prize pickup device 20 in the anteroposterior direction; and a vertical position detector for detecting the position of the prize pickup device 20 in the up-and-down direction. As these position detectors, for example, limit switches 104 are provided at movement limit positions of the prize pickup device 20 in the X direction, the Y direction, and the Z direction respectively. When the prize pickup device 20 reaches its movement limit positions in the X direction, the Y direction, or the Z direction respectively, the relevant limit switch(es) 104 send a movement limit detection signal S2 accordingly.

The sensor 40 in the opening/closing unit 25 is designed to send a position detection signal S3 regarding the detected position to the control unit 100. Also, the sensor 60 in the distance adjustment unit 26 is designed to send a position detection signal S4 regarding the detected position to the control unit 100.

In the upper part of the prize delivery opening 18, there is a counter 105 for counting the number of prizes obtained by the player. The counter 105 sends the count value S5 to the control unit 100, and the count value S5 is then stored in the storage unit 101.

The control unit 100 makes the prize game apparatus 1 execute game operations as designated by the player according to the manipulation signals S1 to S5 in the processing sequence for running the prize game as shown in FIGS. 15 to 18.

Specifically speaking, when the control unit 100 recognizes that a previously set number of coins for one play are inserted into the coin slot 15 (see FIG. 1), it starts the prize game execution processing sequence in step SP0 and then waits for the first control switch 16A (see FIG. 1) on the console 14 (see FIG. 1) to be pressed in the following step SP1.

When the control unit 100 recognizes, based on the manipulation signal S1 from the first control switch 16A, that the player has pressed the first control switch 16A (SP1: YES), the processing proceeds to step SP2 where the control unit 100 puts the X-direction motor 6X of the moving unit 6 (see FIG. 2) into operation and starts moving the prize pickup device 20, which is located in its initial state at a home position directly above the prize guide passage 17 (see FIG. 1), in the transverse direction (X direction).

Then the processing proceeds to step SP3 where the control unit 100 judges, based on the movement limit detection signal S2 from the relevant limit switch 104, whether or not the prize pickup device 20 has reached the transverse movement limit position. In the following step SP4, the control unit 100 judges, based on the manipulation signal S1 from the first control switch 16A, whether or not the pressing force on the first control switch 16A has been removed. If the control unit 100 obtains negative results in both steps SP3 and SP4 ("NO" in both SP3 and SP4), the processing returns to step SP3.

On the other hand, if the control unit 100 obtains an affirmative result in step SP3 or SP4 ("YES" in SP3 or SP4), the processing proceeds to step SP5 where the control unit 100 stops the X-direction motor 6X of the moving unit 6 and terminates the transverse (X-direction) movement of the prize pickup device 20. Subsequently, the processing proceeds to step SP6 where the control unit 100 waits for the second control switch 16B (FIG. 1) on the console 14 to be pressed.

If the control unit 100 recognizes, based on the manipulation signal S1 from the second control switch 16B that the second control switch 16B has been pressed (SP6: YES), the processing proceeds to step SP7 where the control unit 100 puts the Y-direction motor 6Y of the moving unit 6 into operation and starts moving the prize pickup device 20 in the anteroposterior direction (Y direction).

Then the processing proceeds to step SP8 where the control unit 100 judges, based on the movement limit detection signal S2 from the relevant limit switch 104, whether or not the prize pickup device 20 has reached the anteroposterior movement limit position. In the following step SP9, the control unit 100 judges, based on the manipulation signal S1 from the second control switch 16B, whether or not the pressing force on the second control switch 16B has been removed. If the control unit 100 obtains negative results in both steps SP8 and SP9 ("NO" in both SP8 and SP9), the processing returns to step SP8.

If the control unit 100 obtains an affirmative result in step SP8 or SP9 ("YES" in SP8 or SP9), the processing proceeds to step SP10 where the control unit 100 stops the Y-direction motor 6Y of the moving unit 6 and terminates the anteroposterior (Y-direction) movement of the prize pickup device 20. Subsequently, the processing proceeds to step SP11 where the control unit 100 puts the opening/closing motor 35 of the prize pickup device 20 into operation and opens the pickup arms 22A, 22B, 23A, and 23B of the prize pickup device 20.

The processing then proceeds to step SP12; and if the control unit 100 recognizes, based on the signal S3 from the sensor 40, that the pickup arms 22A, 22B, 23A, and 23B have been opened to the maximum extent (SP12: YES), the control unit 100 stops operating the opening/closing motor 35, proceeds to step SP13 while keeping the pickup arms 22A, 22B, 23A and 23B open, and waits for the distance adjustment switch 16C (see FIG. 1) on the console 14 to be pressed.

When the control unit 100 recognizes, based on the manipulation signal S1 from the distance adjustment switch 16C, that the distance adjustment switch 16C has been pressed (SP13: YES), the processing proceeds to step SP14 where the control unit 100 puts the distance adjustment motor 55 into operation and starts moving the pickup arms 23A and 23B of the prize pickup device 20.

Subsequently, the processing proceeds to step SP15 where the control unit 100 makes the timer 103 measure the movement time of the pickup arms 23A and 23B. If the control unit 100 determines that the movement time is within the predetermined time limit (i.e., the time limit has not expired) (SP15: NO), the processing proceeds to step SP16 where the control unit 100 judges whether or not the distance between the pair of pickup arms 22 and the pair of pickup arms 23 is at its maximum. On the other hand, when the predetermined time limit has expired in step SP15 (SP15: YES), the processing proceeds to step SP19 where the control unit 100 stops the distance adjustment motor 55 and terminates the movement of the pickup arms 23A and 23B.

If the control unit 100 determines in step SP16 that the distance between the pair of pickup arms 22 and the pair of pickup arms 23 is not at its maximum (step SP16: NO), the processing proceeds to step SP17. On the other hand, if the control unit 100 determines in step SP16 that the distance is at its maximum (step SP16: YES), the processing proceeds to step SP19 where the control unit 100 stops the distance adjustment motor 55 and terminates the movement of the pickup arms 23A and 23B.

Subsequently, the control unit 100 judges in step SP17, based on the signal S4 from the sensor 60, whether or not the distance between the pair of pickup arms 22 and the pair of pickup arms 23 is at its minimum. If the control unit 100 determines that the distance is not at its minimum (SP17: NO), the processing proceeds to step SP18 where the control unit 100 judges, based on the manipulation signal S1 from the distance adjustment switch 16C, whether the pressing force on the distance adjustment switch 16C has been removed. If the control unit 100 determines that the pressing force on the distance adjustment switch 16C has been removed (SP18: YES), the processing proceeds to step SP19 where the control unit 100 stops the distance adjustment motor 55 and terminates the movement of the pickup arms 23A and 23B. On the other hand if the control unit 100 determines in step SP17 that the distance is at its minimum (SP17: YES), or if it determines in step SP18 that the pressing force on the distance adjustment switch 16C has not been removed (SP18: NO), the processing returns to step SP14.

Meanwhile, if the control unit 100 determines in step SP13 that the distance adjustment switch 16C has not been pressed (SP13: NO), the processing proceeds to step SP20 where the control unit 100 makes the timer 103 measure the time that elapses until the distance adjustment switch 16C is pressed. If the control unit 100 determines that the predetermined time limit has expired (SP20: YES), the processing proceeds to step SP19. Otherwise, the processing returns to step SP13 until the expiration of the predetermined time limit (SP20: NO).

After terminating the movement of the pickup arms 23A and 23B in step SP19, the processing proceeds to step SP21 where the control unit 100 puts the Z-direction motor 6Z of the moving unit 6 into operation and starts lowering the prize pickup device 20. Then the processing proceeds to step SP22 where the control unit 100 waits for the prize pickup device 20 to finish moving to the downward movement limit position.

When the control unit 100 recognizes, based on the movement limit detection signal S2 from the limit switch 104, that the prize pickup device 20 has reached the downward movement limit position, the processing proceeds to step SP23 where the control unit 100 stops the Z-direction motor 6Z of the moving unit 6 and terminates the downward movement of the prize pickup device 20. Subsequently, the processing proceeds to step SP24 where the control unit 100 puts the opening/closing motor 35 of the prize pickup device 20 into operation to close the pickup arms 22A, 22B, 23A, and 23B.

The processing then proceeds to step SP25 where the control unit 100 puts the Z-direction motor 6Z of the moving unit 6 into operation and starts elevating the prize pickup device 20. Subsequently, the processing proceeds to step SP26 where the control unit 100 waits for the prize pickup device 20 to finish moving to the upward movement limit position.

When the control unit 100 confirms, based on the movement limit detection signal S2 from the limit switch 104, that the prize pickup device 20 has reached the upward movement limit position, the processing proceeds to step SP27 where the control unit 100 stops the Z-direction motor 6Z of the moving unit 6 and terminates the elevation of the prize pickup device 20. The processing then proceeds to step SP28 where the control unit 100 puts each of the X-direction motor 6X and the Y-direction motor 6Y of the moving unit 6 into operation and moves the prize pickup device 20 back to its home position directly above the prize guide passage 17.

The processing then proceeds to step SP29 where the control unit 100 puts the opening/closing motor 35 of the prize pickup device 20 into operation and opens the pickup arms 22A, 22B, 23A, and 23B of the prize pickup device 20 (the motion to release the prize 4). The processing then proceeds to step SP30 where if the prize 4 is dropped into the prize delivery opening 18, the counter 105 counts the number of the obtained prize(s) 4 and the number counted is stored in the storage unit 101.

Next, the processing proceeds to step SP31 where the control unit 100 judges, based on the signal S4 from the sensor 60, whether or not the distance between the pair of pickup arms 22A and 22B and the pair of pickup arms 23A and 23B is at its minimum. If the control unit determines that the distance is not at its minimum (SP31: NO), the processing proceeds to step SP32, where the control unit 100 puts the distance adjustment motor 55 into operation and moves the pickup arms 23A and 23B to their original positions, and then the processing proceeds to step SP33. On the other hand, if the control unit 100 determines that the distance is at its minimum (SP31: YES), the processing proceeds to step SP32.

In step SP33, the control unit 100 closes the pickup arms 22A, 22B, 23A, and 23B again and proceeds to step SP34. In step SP34, the control unit 100 judges whether or not the game is to be played again, based on the number of remaining games or whether or not the game retry switch 16D has been pressed. If the game is to be played again (SP34: YES), the processing proceeds to step SP35.

In the following step SP35, the control unit 100 finds the payout rate by calculating the number of obtained prizes counted by the counter 105 with respect to the number of coins inserted into the coin slot 15 (the total amount of money if the coin is 100 yen). If the control unit 100 determines that this payout rate is not higher than a predetermined threshold value (SP35: NO), the processing proceeds to step SP36 where the control unit 100 lowers the game difficulty level and stores it in the storage unit 101, and the processing then returns to step SP1. On the other hand, if the control unit 100 determines that the payout rate is higher than the predetermined threshold value (SP35: YES), the processing proceeds to step SP37 where the control unit 100 increases the game difficulty level and stores it in the storage unit 101, and the processing then returns to step SP1.

As an example of a method for lowering the game difficulty level, the operation of the distance adjustment motor 55 may be controlled when the player uses the distance adjustment switch 16C to adjust the distance between the pair of pickup arms 22A and 22B and the pair of pickup arms 23A and 23B, so that the adjusted distance will allow the pickup arms 22A, 22B, 23A, and 23B to easily pick up the prize 4. As an example of a method for increasing the game difficulty level, the operation of the distance adjustment motor 55 may be controlled when the player uses the distance adjustment switch 16C to adjust the above-described distance, so that the adjusted distance will make it difficult for the pickup arms 22A, 22B, 23A, and 23B to pick up the prize 4.

The number of coins inserted into the coin slot 15 is detected by a coin sensor (not shown) located down below the coin slot 15. When the prize 4 falls into the prize guide passage 17, a sensor (such as an infrared sensor) (not particularly shown in the drawing, but located down below the prize guide passage 17) for detecting the falling motion of the prize 4 will detect the prize 4 falling down. The control unit 100 finds the payout rate based on the information obtained above by calculating the number of prizes paid out with respect to the number of inserted coins. If the player won three prizes out of ten times playing the game (for example, out of ten times they inserted a 100 yen coin), the payout rate would be 30%.

If the control unit 100 determines that the payout rate is 30%, it refers to table data stored in the storage unit 101 and decides how long or short the distance between the pair of pickup arms 22 and the pair of pickup arms 23 should be made by using the distance adjustment unit 26, that is, how much the distance adjustment motor 55 should be rotated (the number of rotations or the time for rotation).

On the other hand, if the game is not to be played again (SP34: NO), the processing proceeds to step SP38 where the control unit 100 terminates this processing sequence for running the prize game. If the player succeeds in picking up the prize 4 with the prize pickup device 20 in the prize game apparatus 1, the prize 4 grasped by the pickup arms 22A, 22B, 23A, and 23B of the prize pickup device 20 is carried to the position above the prize guide passage 17 and the prize-releasing motion of the prize pickup device 20 makes the prize 4 fall into the prize guide passage 17. Consequently, the player can remove the prize 4 from the prize delivery opening 18.

In this prize game apparatus 1, specified images can be displayed on the liquid crystal monitor 28 during the execution of the game according to a program loaded in the image display board 29. Specifically speaking, if the program loaded in the image display board 29 is a "slot game (for example, a player wins the slot game when he/she gets the numbers '777')," the slot game is displayed and executed on the liquid crystal monitor 28 before starting the prize game or after the termination of the prize game. As a result, if the player gets triple seven "777," the "distance between the pair of pickup arms 22 and the pair of pickup arms 23" is extended, thereby making it easier to pick up a prize even if the prize is large. If the player wins the slot game before starting the prize game, they can enjoy the prize game on conditions advantageous to themselves. If the player wins the slot game after starting the prize game, they can get a "bonus play." This "bonus play" can be either with or without charge.

More specifically, the slot game program can be executed to perform an automatic lottery (whether the player wins or loses the lottery is decided by random numbers) before the control unit 100 executes the prize game program, or as triggered by the aforementioned sensor's detection of the prize falling into the prize guide passage 17 (termination pattern 1), or as triggered by the limit switch 104 detecting that the pickup unit 21 has returned to its home position (termination pattern 2). If it is determined, as a result of the internal lottery, that the player has won the lottery, game images showing design patterns turning and a game image showing triple seven "777" (winning design pattern) are displayed on the liquid crystal monitor 28. The image to announce the "lottery win" is then displayed on the liquid crystal monitor 28, and a control signal is sent to the distance adjustment motor 55 in order to extend the "distance between the pair of pickup arms 22 and the pair of pickup arms 23."

Meanwhile, if the prize game is not executed, images to attract the player to the game can be displayed on the liquid crystal monitor 28 according to the program loaded in the image display board 29. Also, sounds or music can be emitted from a speaker (not shown) at the same time as the images are displayed on the liquid crystal monitor 28.

This embodiment described the case where the distance between the pair of pickup arms 22A and 22B and the pair of pickup arms 23A and 23B is adjusted by the player's operation of the distance adjustment switch 16C on the console 14. However, the invention is not limited to this example, and an administrator may set the distance in advance based on various information such as the type of the prize 4, the type of the pickup arms 22A, 22B, 23A, and 23B, and the claws 32A, 32B, 33A, and 33B (Large, Medium, Small; or other types of classification), and the payout rate for the prize 4. In this case, it is unnecessary to provide the distance adjustment switch 16C on the console 14, and the administrator may operate the switch panel and/or the liquid crystal touch panel (not shown) inside the door 19 to make any necessary settings.

Moreover, this embodiment described the case where the two pairs of pickup arms 22 and 23 are provided. However, the invention is not limited to this configuration, and three or more pairs of pickup arms may be provided. In this case, the distances between adjacent pairs of pickup arms may be different or the same. Also, the distance adjustment may be made individually or all at the same time.

What is claimed is:

1. A prize game apparatus comprising:

a pickup unit capable of moving in specified directions;

plural pairs of pickup arms attached to the pickup unit;

an opening/closing unit for opening and closing the pairs of pickup arms; and a distance adjustment unit for adjusting the distance between the plural pairs of pickup arms by laterally moving the pair(s) of pickup arms along a member perpendicular to a direction of arm movement for opening and closing the arms;

wherein a prize is picked up or released by closing or opening the pairs of the pickup arms; and wherein a first pair of the pairs of pickup arms are contactable with a second pair of the pairs of pickup arms adjacent thereto.

2. The prize game apparatus according to claim 1, wherein the distance adjustment unit includes a distance adjustment motor, feed screws rotated by the distance adjustment motor, and feed nuts screwed on the feed screws and connected to the pickup arms, wherein the pair of pickup arms is moved and the distance adjusted by rotating the feed screws.

3. The prize game apparatus according to claim 2 further comprising a distance adjustment motor controller for drive control of the distance adjustment motor based on external information input.

4. The prize game apparatus according to claim 3, further comprising a position sensor for sensing the position of the pickup arms, wherein the distance adjustment motor controller controls driving of the distance adjustment motor based on position information about the pickup arms as sensed by the position sensor.

5. The prize game apparatus according to claim 3, further comprising a storage unit for storing prize-pickup information about the prize picked up by the pickup arms, wherein the distance adjustment motor controller controls driving of the distance adjustment motor based on the prize-pickup information stored in the storage unit.

6. The prize game apparatus according to claim 3, further comprising a timer for measuring adjustment time, that is, the time taken to adjust the distance, wherein the distance adjustment motor controller controls driving of the distance adjustment motor based on the value measured by the timer.

7. The prize game apparatus according to claim 1, wherein the opening/closing unit includes an opening/closing motor, a worm rotated by the opening/closing motor, and a pair of worm wheels engaging with the worm, wherein the worm wheels are respectively connected to the base end of one pair of pickup arms, from among the plural pairs of pickup arms, and the worm wheels are rotated by rotations of the worm, thereby opening or closing the pair of pickup arms.

8. The prize game apparatus according to claim 7, further comprising a transmission shaft for transmitting the rotation of the worm wheels to the remaining pair of pickup arms by connecting the worm wheels to the remaining pair of pickup arms.

9. The prize game apparatus according to claim 7, further comprising:

an opening-action locking member for locking the opening action of the pickup arms by coming in contact with the pickup arms and preventing the rotation of the worm wheels when the worm wheels have rotated a specified amount in a first direction; and a closing-action locking member for locking the closing action of the pickup arms by coming in contact with the pickup arms and preventing the rotation of the worm wheels when the worm wheels have rotated in a specified amount in the direction opposite the first direction.

10. The prize game apparatus according to claim 9, further comprising a force-applying member for applying force to close the pickup arms when the pickup arms are locked by a closing-action locking member.

11. The prize game apparatus according to claim 10, wherein the worm is mounted at a position enabling contact with the force-applying member and the mounting position can be changed, and wherein the expansion/contraction length of the force-applying member is changed according to the mounting position.

12. The prize game apparatus according to claim 1, comprising:

a prize pickup device for picking up a prize;

an operating unit for a player to operate the prize pickup device;

a delivery opening allowing the prize to be discharged; and a housing for accommodating the prize, the prize pickup device, and the delivery opening;

wherein the pickup unit, the pickup arms, and the opening/closing unit are provided on the prize pickup device; and wherein the distance adjustment unit adjusts the distance based on information input from the operating unit.

13. A prize game apparatus, comprising:

a pickup unit movable in specified directions;

plural pairs of pickup arms attached to the pickup unit;

a single opening/closing unit for opening and closing the pairs of pickup arms; and a distance adjustment unit for adjusting the distance between the plural pairs of pickup arms by laterally moving the pair(s) of pickup arms along a member perpendicular to a direction of arm movement for opening and closing the arms;

wherein a prize is picked up or released by closing or opening the pairs of the pickup arms, and wherein the single opening/closing unit is used to open and close the plural pairs of pickup arms.

14. The prize game apparatus according to claim 13, wherein the distance adjustment unit includes a distance adjustment motor, feed screws rotated by the distance adjustment motor, and feed nuts screwed on the feed screws and connected to the pickup arms, wherein the pair of pickup arms is moved and the distance adjusted by rotating the feed screws.

15. The prize game apparatus according to claim 13, wherein the opening/closing unit includes an opening/closing motor, a worm rotated by the opening/closing motor, and a pair of worm wheels engaging with the worm, wherein the worm wheels are respectively connected to the base end of one pair of pickup arms, from among the plural pairs of pickup arms, and the worm wheels are rotated by rotations of the worm, thereby opening or closing the pair of pickup arms.

16. The prize game apparatus according to claim 15, further comprising a transmission shaft for transmitting the rotation of the worm wheels to the remaining pair of pickup arms by connecting the worm wheels to the remaining pair of pickup arms.

17. The prize game apparatus according to claim 13, wherein the distance adjustment unit adjusts the distance based on the payout rate at which the prize(s) are paid out.

18. The prize game apparatus according to claim 13, wherein a first pair of the pairs of pickup arms are contactable with a second pair of the pairs of pickup arms adjacent thereto.

* * * * *

UNITED STATES PATENT AND TRADEMARK OFFICE

CERTIFICATE OF CORRECTION

PATENT NO. : 7,731,587 B2
APPLICATION NO. : 11/485584
DATED : June 8, 2010
INVENTOR(S) : Naoji Kumagai It is certified that error appears in the above-identified patent and that said Letters Patent is hereby corrected as shown below:

ON THE TITLE PAGE:

Item (73) Assignee:, change "Kabushiki Kaisha Sega, Tokyo (JP)" to --Kabushiki Kaisha Sega d/b/a Sega Corporation, Tokyo (JP)--.

Signed and Sealed this

Twelfth Day of October, 2010

David J. Kappos
*Director of the United States Patent and Trademark Office*